United States Patent
Dutt et al.

(10) Patent No.: US 10,762,581 B1
(45) Date of Patent: Sep. 1, 2020

(54) SYSTEM AND METHOD FOR CONVERSATIONAL REPORT CUSTOMIZATION

(71) Applicant: Intuit Inc., Mountain View, CA (US)

(72) Inventors: Bala Dutt, Bangalore (IN); Spencer Jensen, London (GB); Sai Vamsi Krishna Lolla, Fremont, CA (US); Shibani S, Bangalore (IN); Surya Ravishankaran, Bangalore (IN); Soumitra Ghosh, Bangalore (IN)

(73) Assignee: Intuit Inc., Mountain View, CA (US)

( * ) Notice: Subject to any disclaimer, the term of this patent is extended or adjusted under 35 U.S.C. 154(b) by 300 days.

(21) Appl. No.: 15/961,534

(22) Filed: Apr. 24, 2018

(51) Int. Cl.
  *G06Q 40/00* (2012.01)
  *H04L 12/58* (2006.01)
  *G06F 16/332* (2019.01)

(52) U.S. Cl.
  CPC ....... *G06Q 40/125* (2013.12); *G06F 16/3328* (2019.01); *G06F 16/3329* (2019.01); *H04L 51/02* (2013.01)

(58) Field of Classification Search
  CPC .............................. G06F 16/3329; H04L 51/02
  See application file for complete search history.

(56) References Cited

U.S. PATENT DOCUMENTS

| | | |
|---|---|---|
| 6,460,042 B1 | 10/2002 | Hitchcock et al. |
| 7,139,757 B1 | 11/2006 | Apollonsky |
| 7,653,622 B2 | 1/2010 | Huentelman et al. |
| 7,813,989 B2 | 10/2010 | Jones et al. |
| 8,706,762 B1 | 4/2014 | Patzer et al. |
| 8,731,973 B2 | 5/2014 | Anderson et al. |
| 8,775,416 B2 | 7/2014 | Heck |
| 9,934,213 B1 | 4/2018 | Dutt et al. |
| 2002/0174196 A1 | 11/2002 | Donohoe et al. |
| 2003/0188260 A1 | 10/2003 | Jensen et al. |
| 2004/0254953 A1 | 12/2004 | Winchell, III |
| 2006/0007189 A1 | 1/2006 | Gaines et al. |
| 2007/0073519 A1 | 3/2007 | Long |
| 2007/0168382 A1 | 7/2007 | Tillberg et al. |
| 2008/0154824 A1 | 6/2008 | Weir et al. |
| 2008/0235319 A1 | 9/2008 | Zargham et al. |
| 2009/0074303 A1 | 3/2009 | Filimonova et al. |
| 2009/0144157 A1 | 6/2009 | Saracino et al. |
| 2010/0179860 A1 | 7/2010 | Noel et al. |
| 2011/0179036 A1 | 7/2011 | French et al. |
| 2011/0184863 A1 | 7/2011 | Colemann et al. |
| 2011/0222776 A1 | 9/2011 | Jiang et al. |
| 2011/0252313 A1 | 10/2011 | Tanushree et al. |
| 2012/0123996 A1 | 5/2012 | Krinsky |

(Continued)

FOREIGN PATENT DOCUMENTS

WO       WO 01/06416       1/2001

*Primary Examiner* — A. Hunter Wilder
(74) *Attorney, Agent, or Firm* — Paradice and Li LLP

(57) ABSTRACT

An independently operating smart agent is created for each report customization option associated with base reports provided by a data management system. Each smart agent operates independently of the other smart agents to generate response element data for the report customization option assigned to that smart agent. The response element data generated by the set of smart agents is stored in a shared memory. After validation, the response element data is collected to generate report query data and the report query data is transmitted to the data management system for real-time creation of a customized report.

10 Claims, 7 Drawing Sheets

(56) References Cited

U.S. PATENT DOCUMENTS

| | | |
|---|---|---|
| 2012/0150888 A1 | 6/2012 | Hyatt et al. |
| 2013/0318426 A1 | 11/2013 | Shu et al. |
| 2014/0108456 A1 | 4/2014 | Ramachandrula et al. |
| 2014/0195891 A1 | 7/2014 | Venkata Radha Krishna Rao et al. |
| 2014/0207631 A1 | 7/2014 | Fisher |
| 2015/0046224 A1 | 2/2015 | Adjaoute |
| 2018/0101760 A1 | 4/2018 | Nelson et al. |
| 2019/0129931 A1 | 5/2019 | Hegde et al. |

400

| Income by Customer – Jan 1, 2016 to Dec 31, 2016 || 431 |
|---|---|---|
| Customer | Income | 421 |
| ABC Corp | $4,000.00 | |
| DEF Corp | $3,000.00 | |
| GHI Corp | $10,000.00 | 412 |
| JKL Corp | $5,000.00 | |
| MNO Corp | $6,000.00 | |
| TOTAL | $28,000.00 | |

422 points to the Customer column; 411 points to the table.

SYSTEM AND METHOD FOR CONVERSATIONAL REPORT CUSTOMIZATION

BACKGROUND

A Chatbot Conversational System (CCS) is typically used to interact with a user via text or voice conversations that imitate natural human conversations, behavior, and interactions. Some CCSs provide a Conversational User Interface (CUI) and act as a translator between a user and an application with which a user desires to interact, thereby allowing a user to use voice or text to interact with the application through the CCS. For a CCS processing voice data, Automatic Speech Recognition (ASR) can be utilized to convert user speech or voice data to text. For processing text data, a CCS can use Natural Language Understanding (NLU) to recognize the meaning of the text data. In this way, the CCS can provide an engaging user experience and a lifelike, or human-like, conversational interaction between the user and the application.

Within the framework of some CCSs, the term "intent" is used to include one or more actions desired by a user. An intent is typically determined based on an analysis of a user's input voice or text data, i.e., conversational input data, provided to the CCS through the CUI. An intent typically has a corresponding action to be performed in response to the user's conversational input data.

For example, a user's intent may be to order a large pepperoni and sausage pizza from Acme Pizza House, a local pizza provider. The user's initial conversational input to the CUI of the CCS could be a spoken utterance, or perhaps text input, representing a phrase that invokes the intent. For example, the user's initial conversational input data may be an utterance, or text, of "I'd like to order a pizza." After receiving this initial conversational data, the CCS analyzes the initial conversational data and identifies the term "order pizza" to determine that the intent is to "order pizza."

However, the intent "order pizza" must be refined in order to fulfill the user's actual desire. Consequently, the CCS would then typically solicit and collect additional conversational data from the user to determine specifics about the "order pizza" intent, such as provider, size, toppings, etc. Operating within the traditional framework of some CCSs, this additional user conversational input data is typically termed a "slot," which is additional conversational input data that is required to fulfill the entire user intent. For example, in our specific example, the CCS may respond to an utterance of "I'd like to order a pizza" with response conversational data, e.g., a request for slot data, of "Sure, from which pizza place would you like to order the pizza?" The user may then respond with additional conversational input data of "Acme Pizza House."

Once this first slot conversational data is obtained, the CCS may then respond with conversational data of "Sure, what size?" The user may then respond with additional conversational data of "large." Once this second slot data is obtained, the CCS may then respond with conversational data of "Sure, what do you want on it?" The user may then respond with additional conversational data of "pepperoni."

Once this third slot data is obtained, the CCS may then respond with conversational data of "Is there another topping you want on it?" The user may then respond with additional conversational data of "yes, sausage." Once this fourth slot data is obtained the CCS may respond with conversational data of "Is there another topping you want on it?" The user may then respond with additional conversational data of "No, that is it."

Once this fifth slot data is obtained the CCS may respond with conversational data of "Where do you want the pizza delivered?" The user may then respond with additional conversational data of "Home." The CCS may then determine it has enough slot data to fulfill the user's entire and correct "order pizza" intent.

Importantly, using a traditional CCS, slots, or slot data, are typically requested and obtained in a specific linear order with additional and sequential conversational data as shown in the example above. In addition, using a traditional CCS, the user's intent is only fulfilled once all the slot data associated with the determined intent is collected.

It is to be understood that, in various situations, it may be predetermined that the fulfillment of an intent may not require a slot, may require one slot, or may require any number of slots. However, importantly, using a traditional CCS, the slot data for each of the slots predetermined as required for a given intent must be collected before an attempt is made to actually fulfill the determined intent. This is true even if a given user does not actually require one or more of the slots to be addressed in order to satisfy that user's particular desire.

After a traditional CCS determines the intent from conversational input data and sequentially collects all necessary slot data to fulfill the intent correctly, the CCS typically invokes a fulfillment mechanism or application, such as an application used to actually order the pizza, to fulfill the intent. Then, once the pizza is ordered, the CCS may indicate fulfillment of the intent by the related fulfillment application by providing a user with additional conversational data of, "Got it, your pizza has been ordered."

As noted above, with a traditional CCS, a conversation with the CCS is a linear process, i.e., the intent and each of the slots is processed in a sequential manner, and all slot data must be collected before action is taken to actually fulfill the intent. For example, the linear process may begin with the CCS determining an intent of a user from a specific conversational input data utterance. After determining the intent, the intent may require a first step of determining a first slot. After a first slot is determined, the intent may require a second step of determining a second slot, and so on. Under this example, each required slot may be based on the determination of a prior slot, such that an intent triggers a chain of sequential slot determinations, but each slot must be determined before the intent is fulfilled.

Traditional linear approaches to a CCS have proven effective for some applications, such as customer care solutions including on-demand troubleshooting of a device error in which a customer is instructed to follow a series of diagnostic steps to resolve the problem with the device. Such diagnostic steps traditionally lead to resolution of device problems because such steps model the way human technicians behave when problem-solving device errors. Consequently, the linear and sequential steps of collecting slot data seems like a natural type of interaction to the user.

However, a series of required sequential steps is often cumbersome and contrary to how human users approach other tasks, for instance, a desire to extract information from data management systems in the form of reports customized to the user's current needs. Typically, users desire to extract such information through reports that they historically, and naturally, customize in a non-liner, buffet-like, manner. In addition, users often desire intermediate reports that do not necessarily include all customization options that are eventually desired. Users then often want the option to create new reports with additional, or different, report customizations.

For example, when using traditional, i.e., non-CCS, methods of requesting a report, a Graphical User Interface (GUI) is provided through the data management system and the user is presented with a display of many, or even all, customization options for the creation of reports. These customizations options are typically presented to the user visually, and often simultaneously. In this traditional non-CCS approach, the user is then free to select, and thereby interact with, only those customization options of interest to the user. Using this traditional approach, the user is also free to ignore, i.e., not interact with, all the undesired customization options. In addition, using this traditional approach, the user is also free to add customizations once a given report is generated. Consequently, traditionally, a user interacts with customization options visually and on a highly selective, ad hoc, non-linear, and cumulative basis. However, currently, when conversational data, such as voice data or text data is provided, this intuitive and highly flexible traditional approach to report customization is not available due to the need of current CCS based systems to interact with the user via a linear series of required sequential steps.

For example, a traditional dialog box GUI for report customization may include several customization options in a single display, including the options to present the orientation of the report in either landscape mode or portrait mode, consider only specified date ranges, employ any one or more potential data filters, etc. Traditionally, a user expects to be able to select, ignore, or add-on these report customization options through the GUI without having to walk through all the possible options, and with the capability to see intermediate reports based on a sub-set of customization options. Again, this is possible because the user interacts with a visual user interface display to make selections.

In contrast, if an attempt were made to use a currently available CCS and conversational data to generate a customized report from a data management system, the CCS would require the user to walk through a complete set of sequential steps/questions to accept, reject, or otherwise provide a response for each potential customization option, including undesired and even irrelevant customization options, all in a linear fashion. This would be done using conversational data in the form of a series of questions and answers provided, and responded to, in a pre-defined, and static, sequence, to collect the necessary slot data for each slot/potential option. Only after entire series of questions and answers was walked through, i.e., the slot data for each slot/potential option was collected, would the desired report be generated.

Consequently, the traditional linear approach of a CCS to sequentially collect slots of input data for a customized report is an inefficient and non-intuitive approach for users that is unable to mimic the way a user traditionally, and intuitively, expects to create and customize a report from a data management system. Therefore, traditional CCS approaches to report customization are not considered an effective, flexible, or efficient option.

As discussed above, there is currently a significant need in the data management arts to provide a CCS based report customization method and system capable of interacting with users and data management systems through the CCS in an efficient and non-linear manner to create, customize, and save, user reports; thereby providing a more effective CCS-based customized report generation system.

SUMMARY

Embodiments of the present disclosure provide a technical solution to the technical problem of providing a more efficient customized report generation method and system using a CCS interface.

The disclosed technical solution includes providing a Conversational Report Customization (CRC) system that utilizes one or more independently operating smart agents, each of which is associated with a specific respective report customization option. Each smart agent is utilized to independently identify, collect, validate, process, and follow up on, the report customization assigned to that smart agent when that report customization is determined to be included in conversational input data. Consequently, report customization option data associated with different report customization options can be collected, followed up on, and processed by the smart agents in a non-sequential manner, and only for report customizations determined to be desired by the user. This, in turn, allows for natural, efficient, and non-linear interaction between a user, a CCS, and a data management system for the generation of customized reports based on conversational input data.

In addition, in one embodiment, a customized report can be generated for any set or sub-set of desired customizations to a base report. In one embodiment, the customizations to the base report can be named and saved as a customized base report capable of being called up via conversational input data and being further modified or customized in a conversational manner by simply building on the customized base report using one or more of the smart agents associated with desired customizations/modifications. In this way, any number of intermediate customized reports can be generated and the context of the related customized reports can be recorded and maintained.

More specifically, in one embodiment, when a user submits initial conversational input data to a CCS that includes data determined by the CCS to indicate an intent to obtain a report, the initial conversational input data is analyzed to determine which base report provided by the associated data management system is being requested, or is needed, to respond to the request, i.e., to fulfill the identified intent.

As noted, in one embodiment, the disclosed CRC system includes one or more independently operating smart agents. Each smart agent is associated with a specific report customization option and each smart agent is used to identify, validate, and process, the particular report customization option assigned to that smart agent, but only if that particular report customization option is identified as being requested, either initially through the initial conversational input data, or via follow-up questions submitted to the user by the smart agent.

In one embodiment, each smart agent is capable of identifying, obtaining follow-up input data, and processing the specific report customization option associated with that smart agent independently of other smart agents and their associated report customization options. Since each smart agent operates independently of the other smart agents, in one embodiment, customizations can be identified and processed in a non-linear, i.e., non-sequential, manner and only smart agents associated with identified desired report customizations are activated. It follows that smart agents associated with undesired options are not activated, and therefore there is no interaction with, or processing of, undesired report customization options. This, in turn, means there is no sequential walk through of customization options as required using a traditional CCS and the user is provided a user experience that mimics the way the user traditionally, and intuitively, expects to create and customize a report from a data management system.

Using the disclosed CRC and smart agents, a set of pending desired report customization options is identified and collected by the set of relevant smart agents. The set of pending desired report customization options identified and collected by the set of relevant smart agents are then provided to a shared memory included in the disclosed CRC. In one embodiment, the shared memory includes a blackboard data structure. The report customization options are then stored in the shared memory and added to a list of all pending report customizations. In one embodiment, the pending report customizations are then validated.

In one embodiment, the CRC then builds a customized report query, including the validated report customizations to be applied to the base report as filters and configurations, or as API calls. The customized report query is then provided to the data management system where the base report is generated and modified using the validated report customizations, thereby creating a customized report for the user.

In one embodiment, the context of a user conversation is maintained utilizing the shared memory, which acts a memory shared by the smart agents. In one embodiment, a smart agent updates the shared memory with a user's customization request, such as by adding data to the shared memory or modifying the contents of the shared memory. For example, a user may request a first base report, and a first smart agent updates the shared memory with that first base report information, such as an expense report. In this example, a report of expenses is created with default customization options defined with the expense report, such as a default period option of "YEAR TO DATE." Next in this example, a user may request customization of an option, such as changing the time period to "LAST YEAR." In this example, a second smart agent adds to the shared memory the new period from January 1 to December 31 of last year. Next, in this example, a user may change the first base report to a second base report, for example from an expense report to an income report. In this example, the first smart agent overwrites the prior shared memory's expense report option and replaces it with an income report option. However, rather than using the default options associated with the income report, the shared memory has maintained the context of the conversation with the user and remembers that the user had been asking about the last year, and so the income report is generated with last year's data. In this way, the shared memory enables the smart agents to iteratively configure customized reports that are desirable to the user based on the context of an ongoing conversation with the user.

BRIEF DESCRIPTION OF THE DRAWINGS

FIG. 4 is an illustrative example of a customized report for conversational report customization, in accordance with one embodiment.

Figure 1A:
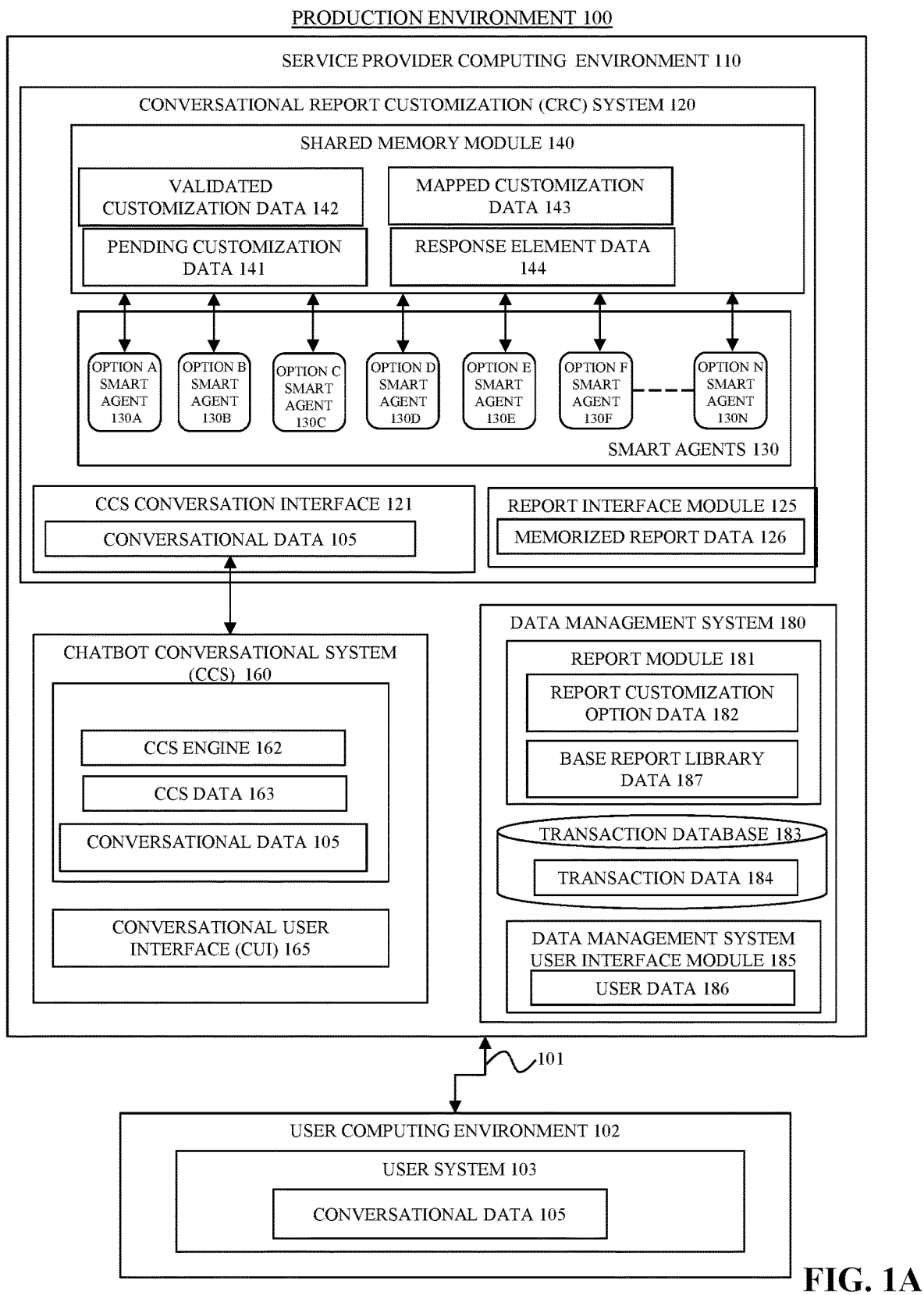
FIG. 1A is a functional block diagram of a production environment for a conversational report customization method and system, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Overview

As discussed in more detail below, embodiments of the present disclosure represent a technical solution to the technical problem of providing more efficient CCS-based customized report generation. In one embodiment, the technical solution includes providing a Conversational Report Customization (CRC) system that utilizes one or more independently operating smart agents, each of which is associated with a specific respective report customization option. Each smart agent is utilized to independently identify, collect, validate, process, and follow up on, the report customization assigned to that smart agent when that report customization is determined to be included in conversational input data. Consequently, report customization option data associated with different report customization options can be collected, followed up on, and processed by the smart agents in a non-sequential manner, and only for report customizations determined to be desired by the user. This, in turn, allows for natural, efficient, and non-linear interaction between a user, a CCS, and a data management system for the generation of customized reports based on conversational input data.

In addition, in one embodiment, a customized report can be generated for any set or sub-set of desired customizations to a base report. In one embodiment, the customizations to the base report can be named and saved as a customized base report capable of being called up via conversational input data and being further modified or customized in a conversational manner by simply building on the customized base report using one or more of the smart agents associated with desired customizations/modifications. In this way, any number of intermediate customized reports can be generated and the context of the related customized reports can be recorded and maintained.

More particularly, in one embodiment, when a user submits initial conversational input data to the CCS, the initial conversational input data is analyzed to determine if the conversational input data indicates an intent to generate a report. If a desire to generate a report is identified, a determination is made through analysis of the initial conversational input data as to which base report provided by the associated data management system is being requested, or is needed, to respond to the request.

In one embodiment, initial conversational input data is forwarded to the disclosed CRC system. In one embodiment, the disclosed CRC system includes one or more independently operating smart agents that are used to identify and validate customizations that are being requested, either initially through the initial conversational input data, or via conversational input data obtained via follow-up questions and answers.

In one embodiment, each smart agent is associated with a specific report customization option and is capable of identifying and processing the specific report customization option associated with that smart agent. Since each smart agent operates independently of the other smart agents, report customizations can be identified, followed up on, and processed in a non-linear, i.e., non-sequential, manner and only smart agents associated with identified report customizations are deployed. Therefore, smart agents associated with undesired report customization options are not activated, and there is no interaction with, or processing of, the undesired report customization options. This, in turn, means there is no sequential walk through of report customization options as is required using traditional CCS-based report customization methods. Therefore, using the disclosed embodiments, the user is provided a user experience that mimics the way users traditionally, and intuitively, expect to create and customize a report from a data management system.

In one embodiment, the set of pending desired report customization options that are identified and collected by the set of relevant smart agents are then provided to a shared memory included in the disclosed CRC. The report customization options are then stored in the shared memory and added to a list of pending report customizations. In one embodiment, the pending report customizations are then validated. In one embodiment, the validated report customizations are then collected into a set of validated report customizations. In one embodiment, the validated report customizations are then collected into a set of validated report customizations to be applied to the base report, thereby creating a customized report for the user.

As a specific illustrative example, in one embodiment, a data management system includes user data, such as user transaction data, that can be extracted and processed to generate one or more reports for the user. In one embodiment, the data management system includes one or more base reports, also referred to herein as standard or default reports, associated with general report topics, such as, but not limited to, a Profit and Loss (P&L) report or an Accounts Receivable (AR) report, capable of being generated by the data management system. It is to be understood that a base report may be based on supply chain management data, customer relationship management data, product life cycle management data, supplier relationship management data, business intelligence data, production planning data, financial accounting data, financial controlling data, material management data, sales data, distribution data, human resources data, quality management data, warehouse management data, logistics management data, project systems data, environment health and safety data, product lifecycle management data, and other management data, as discussed herein, or as known in the art at the time of filing, or as developed, or becomes available, after the time of filing. In one embodiment, the data management system is the fulfillment application that allows a user to customize these base reports by choosing a desired report customization option from a set of available report customization options. The customized report is then provided to the user through the data management system. In this way, the user can obtain and view information that is relevant to the user, or of interest to the user, at a given time and in a given context desired by the user.

As noted above, traditionally, these report customization options were provided visually to the user by the data management system in a GUI, or other display, and the user would select the desired report customization options via the displayed GUI, while simply ignoring the undesired report customization options. As also noted above, if an attempt were made to use a currently available CCS to generate a customized report from a data management system, the CCS would require the user to perform each step of a set of sequential steps to accept, reject, or otherwise provide a response for, each potential report customization option, including undesired and even irrelevant report customization options, in a linear fashion, before any report would be generated. This would be done using a lock step series of questions and answers provided, and responded to, in a defined, and virtually static, sequence. Consequently, the traditional linear approach of a CCS to sequentially collect report customization option responses, e.g., slots of input data for a customized report, was an inefficient and non-intuitive approach for users that was unable to mimic the way a user traditionally, and intuitively, expects to create and customize a report from a data management system. Consequently, traditional CCSs were not considered an effective or efficient option for creating customized reports.

As discussed below, to address this long standing technical problem, a Conversational Report Customization (CRC) system is disclosed that allows for the generation of customized reports based on conversational input data provided via a CCS.

In one embodiment, the CCS provides a Chatbot conversational system User Interface (CUI) that allows a user to converse with the CCS and thus provide conversational input data, such as voice or text data, requesting a customized report from the data management system.

In one embodiment, when the CCS receives voice data, text data, or any other conversational input data, from the user, the conversational input data is analyzed to determine the intent. Typically, this analysis includes parsing and analyzing the conversational input data to identify defined key words or phrases determined to indicate an intent to create a report. In addition, in one embodiment, the CCS analyzes the conversational input data to identify key words and phrases that indicate what type of standard, or base, report is likely associated with the intent.

In one embodiment, the CCS further analyzes the conversational data, including one or more of the initial conversational input data and follow on conversational data, e.g., query response or slot data, to identify key words indicating desired customizations.

The operation of CCSs, and other systems for allowing conversational data, such as voice and text data, to be used to interface with one or more CCS-based platforms, are well known in the art. Consequently, a more detailed discussion of CCSs in general is omitted here to avoid detracting from the invention.

In one embodiment, when the CCS determines an intent to create a report, the conversational data is forwarded to the disclosed CRC and it is the disclosed CRC that analyzes the conversational data to identify key words and phrases that indicate what type of report and determine a standard, or base, report associated with the intent. In one embodiment, the standard, or base, report associated with the intent is determined by a specifically assigned report identification smart agent deployed by the CRC. In one embodiment, it is the CRC that further analyzes the conversational data, including one or more of the initial conversational input data and follow on conversational data, e.g., query response or slot data, to identify key words indicating desired customizations.

Once the conversational data, including one or more of the initial conversational input data and follow on conversational data is analyzed to identify key words indicating a base report and desired customizations by either the CCS or CRC, the CRC system uses one or more smart agents associated with specifically assigned report customization options to enable the identified base report to be customized based on the initial and follow up conversational data.

In one embodiment, each smart agent of the disclosed CRC system is associated with a specific report customization option for a base report of the data management system. As discussed in more detail below, in one embodiment, each smart agent parses at least part of the conversational data determined to indicate the specific report customization option associated with that smart agent. In one embodiment, as part of the parsing process, each smart agent determines the data type and format, identifies accounts and customer entities, performs error correction, and applies user meaning and preferences as determined by an analysis of historical user input data and the application of artificial intelligence methods.

In one embodiment, where applicable, each smart agent is capable of performing syntactic and semantic validation of the conversational data indicating the specific report customization option associated with that smart agent. In one embodiment, a syntactic validation process analyzes conversational data received by the smart agent to validate the structure of the conversational data.

For example, if a user says, "Let's change the start date," without finishing the sentence, the smart agent determines that a syntactical error has occurred because no date was provided. In one embodiment, a semantic validation process analyzes conversational data received by the smart agent to validate the meaning of the conversational data. In addition, if a user says, "Let's change the period to next year," although there are no syntactic errors, a start date in the future is a semantic error because a time period for a historical report should be in the past.

In one embodiment, where applicable, each smart agent can map the conversational data indicating the specific report customization option associated with that smart agent to the correct corresponding report customization option available for the base report and can use this mapping to update pending customizations in a CRC shared memory. For example, a base report may have a customization option to be presented in a portrait orientation or a landscape orientation, and an orientation smart agent may be associated with this customization option. The default orientation for the base report may be a portrait orientation. When the orientation smart agent receives conversational data such as, "Turn the report sideways," the orientation smart agent may map this utterance to the orientation customization option. Accordingly, in this example, the shared memory may be updated with a pending customization of "ORIENTATION=LANDSCAPE" to change the base report default's orientation.

In one embodiment, where applicable, each smart agent can generate response elements and provide prompts for more, e.g., follow up/slot, information associated with its assigned report customization option. In one embodiment, a response element is represented by a key-value pair.

For example, a base report may have a customization option to include a company's name in the title at the top of the base report, and there may be a corresponding title smart agent. In this example, after a user reviews a report with a default title of "Profit and Loss," the title smart agent may receive conversational data of "Add my company name to the title." In this example, the title smart agent may parse the term company name and may map the term company name to the actual company name as defined by the data management system. In this example, if the company name is "Ajax Landscaping," then a key may be "report title" and a value may be "Ajax Landscaping Profit and Loss," and the corresponding response element that is generated may be a key-value pair of "REPORT TITLE=AJAX LANDSCAPING PROFIT AND LOSS." Accordingly, under this example, when a report is generated, the response element instructs a report module of a data management system to put a title of "Ajax Landscaping Profit and Loss" at the top of the profit and loss report.

In one embodiment, a follow-up question may need to be presented to a user before a response element can be generated. For example, a base report may have a customization option to change the title at the top of the base report, and there may be a corresponding title smart agent. In this example, the title smart agent may receive conversational data of "Change the title of this report." In this example, the title smart agent may validate that a new report title was not provided by the user. Accordingly, the smart agent may prompt the user, via the CCS, with an additional question of, "Okay, what do you want to call it." After that prompt, the title smart agent may receive from the CCS the conversational data of "Let's call it income statement."

In this example, the title smart agent may parse the term "income statement" and may map this term to the title customization option of the base report. In this example, a key may be "REPORT TITLE" and a value may be "INCOME STATEMENT," and the corresponding response element that is generated may be a key-value pair of "REPORT TITLE=INCOME STATEMENT." Accordingly, under this example, when a report is generated, the response element instructs a report module of a data management system to put a title of "Income Statement" at the top of the profit and loss report.

In one embodiment, where applicable, each smart agent is then used to serialize and desterilize all customizations relevant to it and its assigned report customization option. For example, a data management system may define portrait orientation with a value of "1" and define a landscape orientation with a value of "2." In this example, if an orientation smart agent receives conversational data of "Turn the report sideways," an orientation smart agent may validate the user's request by determining what a base report's orientation is, as defined by a data management system. In this example, the data management system may define a default orientation of a base report as "ORIENTATION=1." The orientation smart agent may deserialize this to be "ORIENTATION=PORTRAIT." The orientation smart agent may then generate a key-value pair of "ORIENTATION=LANDSCAPE," in order to fulfill the user's request to turn the report sideways. In this example, the orientation smart agent may then serialize the key-value pair to "ORIENTATION=2," so that the orientation is in a format that is understandable by the data management system.

In one embodiment, the smart agent then generates the customization option as a response element. In one embodiment, the response element is a key value pair having a general format of "CUSTOMIZATION NAME/FIELD=A SPECIFIC VALUE OR RANGE." For example, a key-value pair may be "TRANSACTION DATE=THIS YEAR TO DATE," which indicates that a report is based on transactions having dates associated with the current year.

In one embodiment, the set of pending desired report customization options identified and collected by the set of relevant smart agents are then provided to the shared memory included in the disclosed CRC. The report customization options are then stored in the shared memory and added to a list of pending report customizations. In one embodiment, the pending report customizations are then validated.

In one embodiment, the CRC then builds a customized report query, including the validated report customizations to be applied to the base report as filters and configurations, or as API calls. The customized report query is then provided to the data management system where the base report is generated and modified using the validated report customizations, thereby creating a customized report for the user.

In one embodiment, a new set of pending desired report customization options may be identified and collected by a set of relevant smart agents, that are then provided to the shared memory included in the disclosed CRC system. The additional report customization options are then stored in the shared memory and added to the prior list of pending report customizations. In one embodiment, the new pending report customizations are then validated. In one embodiment, the CRC system then builds a new customized report query, including the new validated report customizations to be applied to the base report as filters and configurations, or as API calls. The new customized report query is then provided to the data management system where the base report is generated and modified using the new set of validated report customizations, thereby creating a modified customized report for the user.

For example, after a first base report is created for a user, the user may request to see a percent change from a prior year to the current year. In this example, a comparison smart agent modifies the shared memory to include a response element that indicates that a report should include a new column that displays percent change for each row illustrating a prior year amount and a current year amount.

As a specific illustrative example, in one embodiment, a user may request through the CCS to see the user's income for the current year based on data from the data management system. In this specific illustrative example, the user may provide the voice or text conversational data "what is my income this year." In this example, the CCS is configured to recognize that the term "what is" indicates that a user is requesting a report. In this example, the CCS transmits the phrase "what is my income this year" as initial conversational data to a base report option identification smart agent in the CRC system. The base report option identification smart agent parses the phrase "what is my income this year" and determines that the word "income" maps to a profit and loss report. In this example, the base report option identification smart agent generates a key-value pair of "BASE REPORT=PROFIT AND LOSS," and stores this key-value pair in the shared memory.

In this example, the CCS is also configured to recognize the term "year" indicates that a user is requesting a report for a time period. Consequently, in this example, the CCS transmits the phrase "what is my income this year" as initial conversational data to a time period option identification smart agent in the CRC system. The time period option identification smart agent parses the phrase "what is my income this year" to determine the term "this year." In this example, the time period option identification smart agent validates that the profit and loss report can be created based on current year transactions. In this example, the time period option identification smart agent maps the phrase "this year" to a time period defined as a current year of January 1 of the current year to today's date of the current year. In this example, the time period option identification smart agent generates a key-value pair of "TIME PERIOD=CURRENT YEAR," and stores this key-value pair in the shared memory.

In this example, the two key-value pairs of "BASE REPORT=PROFIT AND LOSS" and "TIME PERIOD=CURRENT YEAR" within the shared memory are transmitted as response elements to a data management system. In one embodiment, prior to the transmittal, each smart agent associated with each key-value pair again validates the value associated with the key and validates each key-value pair in relation to other key-value pairs. Then, if a respective smart agent determines invalidity, the respective smart agent prompts the user for information to correct a value of the invalid key-value pair. In one embodiment, the shared memory coordinates and confirms the plurality of validations performed by the independent smart agents. After the data management system receives the data elements of key-value pairs, in this example, the response elements are used as instructions to create a base report of a profit and loss (P&L) statement and populate the report with data associated with the current year.

In this specific illustrative example, after the user views the created customized P&L statement, the user may request from the CCS to see the same customized P&L statement report but only for transactions involving a client named Bob. In this example, the CRC system receives this new conversational data, such as "I only want to see it for Bob," and implements a third client customization option smart agent, such as a client filter smart agent. In this example, the CRC system is additionally able to understand the context of the conversation because the prior conversation, involving the first two smart agents, is still maintained in the shared memory.

In this example, the CCS determines that the term "only" indicates a filter is requested, and the CCS transmits the phrase "I only want to see it for Bob" as conversational data to a client filter customization option smart agent of the CRC system. In this example, the client filter customization option smart agent parses the term "Bob" from the conversational data. Next, in this example, the client filter customization option smart agent validates that "Bob" is a client within the transaction data of the data management system. Next, in this example, the client filter customization option smart agent maps the term "Bob" to a client filter report customization option of the P&L statement report defined by the data management system, such as "CLIENT FILTER." Next, in this example, the client filter customization option smart agent generates a response element of a key-value pair defined as "CLIENT FILTER=BOB."

Next, in this example, the two prior key-value pairs of "BASE REPORT=PROFIT AND LOSS" and "TIME PERIOD=CURRENT YEAR" within the shared memory and the new key-value pair of "CLIENT FILTER=BOB" are transmitted as response elements to a data management system. In one embodiment, prior to the transmittal, each smart agent associated with each key-value pair again validates the value associated with the key and validates each key-value pair in relation to other key-value pairs, and if a respective smart agent determines invalidity, the respective smart agent prompts the user for information to correct a value of the invalid key-value pair. In one embodiment, a coordinated validation is performed by the independent smart agents. After the data management system receives the data elements of key-value pairs, in this example, the response elements are used as instructions to create a base report of a profit and loss (P&L) statement and populate the report with data associated with the current year that is filtered for the client of Bob. In this example, the context of the user's conversation is maintained with each addition or change to response elements by the smart agents.

The present disclosure provides highly efficient, effective, and versatile systems and methods for conversational report customization. However, the disclosed embodiments do not encompass, embody, or preclude other forms of innovation in the area of conversational report customization or CCS based systems.

In addition, the disclosed conversational report customization methods and systems, including the disclosed CRC system, represent a technical solution to a technical problem and are not an abstract idea for at least several reasons. First, the disclosed conversational report customization methods and systems, including the disclosed CRC system, are not an abstract idea because they are not merely an idea itself (e.g., can be performed mentally or using pen and paper).

For example, it is not possible for the human mind to comprehend and validate all of the possible options to customize a large number of reports of a data management system in relative real-time, even with pen and paper to assist the human mind. In contrast, the disclosed embodiments require the use of report customization option data that represents all the possible report customization options. Furthermore, some of the disclosed embodiments include using transaction data from a transaction database to determine possible customizations of a report, such as filters and groupings of report data. Furthermore, as discussed below, some of the disclosed embodiments include utilizing machine-learning algorithms to determine a user's report customization preferences, which cannot be performed mentally or with pen and paper alone in real-time, or even reasonable time.

Second, the disclosed conversational report customization methods and systems, including the disclosed CRC system, are not an abstract idea because they are not a fundamental economic practice (e.g., are not merely creating a contractual relationship, hedging, mitigating a settlement risk, etc.).

In contrast, the disclosed conversational report customization methods and systems, including the disclosed CRC system, provide for customizing a report of a data management system based on a conversation between a user and a CCS. To this end, the user is able to view the user's data so that the user can make operational adjustments to their activity based on thoughts expressed conversationally by the user. This allows the user to analyze relevant information in a non-linear approach to understand the operational drivers behind an activity. In addition, embodiments of the present disclosure allow for reduced use of processor cycles, memory, bandwidth, and power consumption associated with non-linear conversational report customization, compared to a linear approach.

For example, the disclosed embodiments provide for the context of an ongoing conversation with a CCS being utilized to create several iterations of reports that become more relevant to the user. For further example, certain disclosed embodiments provide for saving the customizations so that customized reports can be created periodically based on current data of the data management system, avoiding having to save multiple versions of static reports with out-of-date data. Consequently, computing and communication systems implementing or providing the embodiments of the present disclosure are transformed into more operationally efficient devices and systems.

Third, the disclosed conversational report customization methods and systems, including the disclosed CRC system, are not an abstract idea because they are not a method of organizing human activity (e.g., managing a game of bingo), but are rather, in one embodiment, tools for enabling a user to assess the operational effectiveness of a business through customized reports about the business.

For example, the user's queries about their data and activities are able to be expressed in a conversational manner, allowing the user to make observations about the user's activities that may otherwise be elusive. Such observations enable the user to determine a course of action based on actionable insights from customized reports. Accordingly, both human and non-human resources are utilized more efficiently.

Fourth, although mathematics may be used in the disclosed conversational report customization methods and systems, including the disclosed CRC system, the disclosed and claimed conversational report customization methods and systems, including the disclosed CRC system, are not an abstract idea because they are not simply a mathematical relationship/formula.

In contrast, the disclosed embodiments provide for the customized creation of reports that enable a user to assess activities and operations, and make appropriate changes based on such assessment.

In addition, using the disclosed embodiments, a data management system is provided that increases loyalty to the data management system as users are able to access insights about data stored by the data management system. This results in repeat customers, efficient data management services, and reduced abandonment of use of the data management system, according to one embodiment.

Exemplary Environment

FIG. 1A is a functional block diagram of a production environment 100 for conversational report customization, in accordance with one embodiment. In one embodiment, the production environment 100 includes a service provider computing environment 110 and a user computing environment 102. In one embodiment, the computing environments 110 and 102 are communicatively coupled to each other with one or more communication channels 101. In one embodiment, the communication channels 101 include one or more physical or virtual networks such as any network discussed herein, and/or as known in the art at the time filing, and/or as becomes available after the time of filing.

According to one embodiment, the service provider computing environment 110 represents one or more computing systems, such as one or more servers and/or distribution centers, that are configured to receive, execute, and host one or more data management systems (e.g., applications) for access by one or more users, according to one embodiment. The service provider computing environment 110 can be a traditional data center computing environment, a virtual asset computing environment (e.g., a cloud computing environment), or a hybrid between a traditional data center computing environment and a virtual asset computing environment, according to various embodiments.

According to one embodiment, the service provider computing environment 110 includes a Chatbot Conversational System (CC S) 160, Conversational Report Customization (CRC) system 120, and a data management system 180. It is to be understood that the service provider computing environment 110 may have any number of such systems. It is also to be understood that one or more of such systems may be combined with another system. It is also to be understood that any such system may reside in its own computing environment that is separate from the service provider computing environment 110.

In one embodiment, the user computing environment 102 represents computing environments of the various users of the data management system 180. It is to be understood that there may be a plurality of user computing environments 102. For example, each user of the data management system 180 may have its own user computing environment 102.

In one embodiment, the user computing environment 102 includes a user system 103. The users of the data management system 180 utilize the user computing environments 102 to interact with the data management system 180, in one embodiment through the CCS 160. The users of the data management system 180 can use the user computing environments 102 to provide data, such as conversational data 105, to the CCS 160 to communicate with data management system 180.

In one embodiment, users of the data management system 180 can also provide data to the data management system 180 through user system 103 and receive data from the data management system 180 through user system 103, including data management services and reports.

The data management system user interface module 185 of the data management system 180 is configured to receive user data 186 from the users, according to one embodiment. The user data 186 may be derived from information, such as, but not limited to a user's name, personally identifiable information related to the user, authentication data that enables the user to access the data management system 180, or any other types of data that a user may provide in working with the data management system 180, as discussed herein, or as known in the art at the time of filing, or as developed, or becomes available, after the time of filing.

In one embodiment, the data management system user interface module 185 interacts with the report module 181 to generate and transmit reports to the user computing environment 102.

In one specific illustrative example, data management system 180 is a financial data management system. Consequently, in this specific illustrative example, reports provided through data management system 180 provide insight into various aspects of a person's or company's finances. Some examples of reports for this specific illustrative example are profit and loss (P&L) statements, balance sheet summaries, statements of cash flow, open invoices, customer balance details, account receivable aging summaries, vendor balance details, purchases by vendor summaries, unpaid bills details, transaction details, payroll summaries, and any other reports as discussed herein, or as known in the art at the time of filing, or as developed, or becomes available, after the time of filing.

In one embodiment, data management system 180 includes base report library data 187 representing one or more base, or standard/default, reports. In one embodiment, base report library data 187 includes standard or base report options, i.e., default options, such as date ranges, accounting basis options, format options, filters, etc. that are applied to a report when a user has not yet, or does not, specify or select a customization option.

In the one illustrative example where data management system 180 is a financial data management system, base report library data 187 can include data representing one or more of a standard/default P&L statement, a standard/default balance sheet summary, a standard/default statement of cash flow, a standard/default open invoice report, a standard/default customer balance detail report, a standard/default account receivable aging summary, a standard/default vendor balance detail report, a standard/default purchases by vendor summary, a standard/default unpaid bills detail report, a standard/default transaction detail report, a standard/default payroll summary, and any other standard/default report as discussed herein, or as known in the art at the time of filing, or as developed, or becomes available, after the time of filing.

In once embodiment, in order to provide a user of data management system 180 the capability to request, and receive, customized reports, the report module 181 includes report customization option data 182. Report customization option data 182 includes data representing various report customization options, including, as discussed below, response element data 144 from shared memory module 140 and smart agents 130, that enable a user to change standard or base report options, i.e., default options, and thereby generate a customized report to fit the user's needs and expectations.

In various embodiments, each base report has an associated set of multiple report customization options available for that report. For example, report customization option data 182 can include a report customization option for a base P&L statement to show the report by month. For further example, report customization option data 182 can include a report customization option to specify a specific title for a report. In one embodiment, for any report customization option where the user has not, or does not, specify a customization from report customization option data 182, the standard/default, or base, report options, i.e., default options, are applied.

In one embodiment, for any base report, the report module 181 enables a user to select among the various report options for that base report defined in the report customization option data 182 in order to fully utilize and customize the reporting services of the data management system 180.

In one embodiment, the report customization option data 182 includes, but is not limited to: a report period option including transaction date ranges of a start date and an end date, such as, but not limited to, today, this week, this month, this quarter, this year, yesterday, recent, last week, last month, last quarter, and last year; an accounting method option including cash basis and accrual; a sub-items option including collapse and expand; a sort-by option including default, total in ascending order, and total in descending order; an add sub-columns for comparison option including previous period, previous year, year to date, percent of row, percent of income, dollar change, percent of year to date, percent of column, percent of expense, and percent change; a columns option including, but not limited to, total only, days, weeks, months, quarters, years, clients, vendors, employees, and products/services; a show rows option including active, all, and non-zero; a show columns option including active, all, and non-zero; a filter list customer option; a filter list product/service option; a filter list payment method option; a show negative numbers option including, but not limited to, normal, in parentheses, within a trailing minus, and in bright red; a show all numbers option including, but not limited to, divide by 100, 1000, or any other number, without cents, and except zero amounts; a show company name in header option; a show report title in header option; a show transaction date in header option; a header alignment option; a date prepared in footer option; a time prepared in footer option; a report basis in footer option; a footer alignment option; and any other report option as discussed herein, or as known in the art at the time of filing, or as developed, or becomes available, after the time of filing.

In one embodiment, the report module 181 displays a report as a spreadsheet having rows and columns. In one embodiment, the report module 181 displays a report having at least one value as a widget of a dashboard. In one embodiment, a widget is a graphical representation of a report, such as a pie chart. As discussed below, in one embodiment, the report module 181 displays a report having at least one value, customized or default, provided as an answer in CCS conversational data, such as conversational data 105. In one embodiment, the report module 181 provides a marked up uniform resource locator (URL) that provides for the creation of the customized report via the Internet.

As noted above, in one embodiment, data management system 180 is a financial data management system. Consequently, in one embodiment, the data management system 180 includes a transaction database 183. The transaction database 183 includes transaction data 184. The transaction data 184 may be derived from data indicating the current status of all of the financial accounts of a given user of data management system 180, or all of the users of the data management system 180. Thus, the transaction database 183 can include a vast amount of data related to the data management services provided to users. In one embodiment, the user utilizes the data management system user interface module 185 to view and/or edit the transaction data 184 retrieved from the transaction database 183.

In one embodiment, the CCS 160 includes a CCS engine 162, CCS data 163, and a CUI 165. It is to be understood that the CCS 160 may interface with a plurality of CRC systems 120, a plurality of data management systems 180, and a plurality of user systems 103. In one embodiment, the CCS 160 interfaces directly with the user system 103 via the CUI 165 to receive conversational data 105, along with other data as discussed below. In one embodiment, the CCS 160 interfaces indirectly with the user system 103 via the data management system user interface module 185 of the data management system 180. In this embodiment, the data management system user interface module 185 transmits data to, and from, the CUI 165 and the user system 103.

In one embodiment, CCS 160 includes a CCS engine 162 that enables a conversation with a user via conversational data 105. In one embodiment, the CCS engine 162 is implemented through models, rules, and algorithms. In one embodiment, the CCS engine 162 includes Automatic Speech Recognition (ASR) utilized to convert user speech or voice conversational data 105 to text and Natural Language Understanding (NLU) to recognize the meaning of the text data for processing conversational data 105.

In one embodiment, building blocks of dialogs are stored as CCS data 163, such that CCS dialogs provide for conversations between the CCS 160 and the user of the user system 103.

In one embodiment, the CUI 165 includes a messaging platform. In one embodiment, the messaging platform provides for real-time conveyance of conversational data 105 in the form of short messages. For example, a user may enter text in a text box and then press a send button. For further example, a user may speak an oral message via a microphone, telephone, or other audio source, in which the oral message is translated into text.

The operation of CCSs, such as CCS 160, and other systems for allowing conversational data, such as voice and text data, to be used to interface with one or more CCS-based platforms, are well known in the art. Consequently, a more detailed discussion of CCSs in general, and CCS 160 in particular, is omitted here to avoid detracting from the invention.

In one embodiment, the CRC system 120 includes a CCS conversation interface 121 that interfaces with the CCS 160. In one embodiment, the CCS conversation interface 121 receives, and sends, conversational data 105 to, and from, the CCS 160. In one embodiment, the CCS conversation interface 121 transmits conversational data 105 to, and from, the CCS 160.

In one embodiment, the conversational data 105 represents a question, an answer, or a series of questions and answers. In one embodiment, the question originates from a user in which the question is a request for information from the data management system 180. In one embodiment, the question originates from the CRC system 120 in which the question is a follow-up question, such as a prompt for additional information or a suggestion. It is to be understood that a question is not limited to a query but may also be a statement, a command, or a request.

In one embodiment, the conversational data 105 represents an answer to a question. As discussed in more detail below, in one embodiment, the answer originates from a user that is answering a question prompted by the CRC system 120 and, in one embodiment, originates from a smart agent. For example, as discussed below, if a user is prompted by a date smart agent to select a date period for a report, the user may answer with a selected date period, such as "last year."

In one embodiment, the answer originates from the CRC system 120. For example, if a user poses a question about where a header of a report can be placed, the CRC system 120 may answer using a report format smart agent that a header may be left justified, center justified, or right justified. It is to be understood that an answer is not limited to a response but may also be a follow-up question or an informational statement. Furthermore, as discussed below, an answer may convey a set of data from the transaction data 184 of the data management system 180, such as a report or information from a report.

In one embodiment, the CRC system 120 includes a set of one or more smart agents 130, including in this specific illustrative example, option A smart agent 130A, option B smart agent 130B, option C smart agent 130C, option D smart agent 130D, option E smart agent 130E, option F smart agent 130F, through option N smart agent 130N.

Those of skill in the art will readily recognize that the number of smart agents is variable according to the needs of the user and that the specific number, and type, of smart agents discussed with respect to any of the illustrative examples and embodiments disclosed herein is made for illustrative purposes only and should not be read to impose any limitations on the invention as set forth in the claims below.

As discussed in more detail below, in one embodiment, each of the smart agents 130 are associated with a respective report customization option, e.g., in this specific illustrative example of FIG. 1A, report customization options A, B, C, D, E, and F, through N, and enables the understanding of report customization conversations associated with the smart agent's respective customization option. As also discussed in more detail below, in one embodiment, each of the smart agents 130 autonomously comprehends and/or generates, a part of a conversation represented in conversational data 105, such as a dialog within a conversation.

In various embodiments, report customization options A, B, C, D, E, and F, through N, represent any, or all of the report customizations options discussed herein, known in the art at the times of filing, or as become known in after the time of filing.

In one embodiment, a developer generates each of the smart agents 130 for use by the CRC system 120. In one embodiment, a developer determines each customization option of a base report and creates a respective smart agent for each report customization option. That set of smart agents is then associated with the base report. In one embodiment, the developer instructs the CCS 160 to examine a user's utterance for a word or phrase, which causes the respective smart agents to be triggered.

In one embodiment, the developer codes a first smart agent of the smart agents 130 to recognize a word or phrase within an utterance received from the CCS 160 and cause a second smart agent to be triggered. For example, a customer filter smart agent may search within the data management system 180 customer data for a customer having a specific name, such as ABC Corporation, and if that name is not found within the data management system 180 customer data, the customer filter smart agent may trigger a vendor filter smart agent to analyze the term ABC Corporation and determine whether such is the name of a vendor within the data management system 180 vendor data. It is to be understood that a developer may pre-deploy and create a variety of smart agents, and any number of smart agents needed to process each report customization option of each report provided by the data management system 180, as discussed herein, or as known in the art at the time of filing, or as developed, or becomes available, after the time of filing.

It is further to be understood that, in one embodiment, a smart agent 130 is generated utilizing artificially intelligent smart agent generation. For example, in one embodiment, when a new report customization option is added to the report customization option data 182 of the data management system 180, after notification of the new report customization option is received by the report interface module 125 of the CRC system 120, the CRC system 120 generates a corresponding smart agent 130 utilizing artificial intelligence methods as discussed herein, or as known in the art at the time of filing, or as developed, or becomes available, after the time of filing.

As discussed below, in one embodiment, each of the smart agents 130 are configured to make independent decisions and/or suggestions based on the conversational data 105.

In one embodiment, the CCS 160 first determines that conversational data 105 includes data indicating an intent to request a report. In one embodiment, such a determination is based on the operation of CCS engine 162, and identification of key words or phrases in conversational data 105 indicating a report is desired. In one embodiment, the CCS 160 next determines which base report of base report library data 187 is most likely to be needed to fulfill the user's intent, again based on the operation of CCS engine 162, and identification of key words or phrases in conversational data 105.

In one embodiment, once the intent to request a report, and the correct base report is identified, the CCS 160 determines if any report customizations are being requested, again based on the operation of CCS engine 162, and identification of key words or phrases in conversational data 105. Once the report customizations are identified, the CCS 160 matches the identified report customizations to the smart agents associated with the identified customizations. Consequently, in one embodiment, the CCS 160 thereby determines which of the smart agents 130 will initially be executed to analyze the conversational data 105. In one embodiment, such a determination is based on the operation of CCS engine 162, and identification of key words or phrases in conversational data 105 indicating a user intent and/or slots, and mapping data including in CCS data 163 correlating report customizations to their associated smart agents. In one embodiment, data indicating which of the smart agents 130 will be executed to analyze the conversational data 105 is then included in the conversational data 105 transmitted to CCS conversation interface 121 and the CRC system 120.

In one embodiment, both the CCS 160, i.e., the conversation interface 121 and CCS engine 162, and the CRC system 120, are used to analyze conversational data 105 to determine which of the smart agents 130 will be executed to process the conversational data 105. In one embodiment, a specifically designed coordination, or "uber," smart agent included in smart agents 130 determines which of the smart agents 130 will be executed to analyze the conversational data 105.

As noted above, in one embodiment, the CRC system 120 includes a set of one or more smart agents 130, including in this specific illustrative example, option A smart agent 130A, option B smart agent 130B, option C smart agent 130C, option D smart agent 130D, option E smart agent 130E, option F smart agent 130F, through option N smart agent 130N.

In one embodiment, each of the option A smart agent 130A, option B smart agent 130B, option C smart agent 130C, option D smart agent 130D, option E smart agent 130E, option F smart agent 130F, through option N smart agent 130N, collectively referred to as smart agents 130, are associated with a respective customization option and enable the understanding of report customization conversations. In one embodiment, each of the smart agents 130 autonomously comprehends a part of a conversation represented in conversational data 105, such as a dialog within a conversation. In one embodiment, the set of smart agents 130 include, but are not limited to, respective smart agents corresponding to the report customization option data 182 described above, or as known in the art at the time of filing, or as developed, or becomes available, after the time of filing.

In one embodiment, CRC system 120 utilizes the one or more independently operating option A smart agent 130A, option B smart agent 130B, option C smart agent 130C, option D smart agent 130D, option E smart agent 130E, option F smart agent 130F, through option N smart agent 130N, to independently identify, collect, validate, process, and follow up on, the customization assigned to that smart agent when that customization is determined to be included in conversational data 105.

Figure 1B:
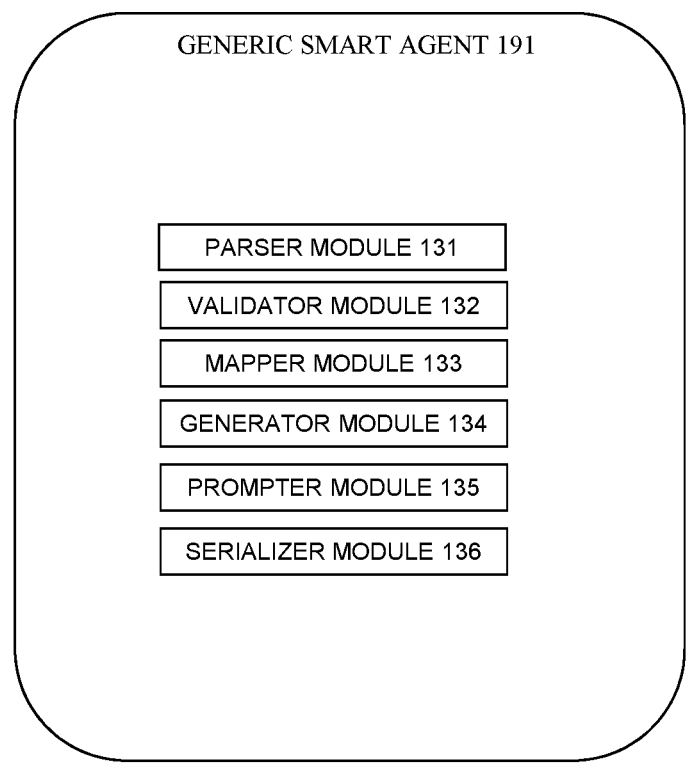
FIG. 1B is a functional block diagram showing more detail of a generic smart agent of the set of smart agents of FIG. 1A, in accordance with one embodiment.

FIG. 1B shows a generic smart agent 191 representative of at least a portion of any of option A smart agent 130A, option B smart agent 130B, option C smart agent 130C, option D smart agent 130D, option E smart agent 130E, option F smart agent 130F, through option N smart agent 130N, or any other smart agent, of smart agents 130. As seen in FIG. 1B, generic smart agent 191, and any of smart agents 130, includes at least one of: a parser module 131, a validator module 132, a mapper module 133, a generator module 134, a prompter module 135, and a serializer module 136.

Referring to FIGS. 1A and 1B together, in one embodiment, the parser module 131 of generic smart agent 191, and any of smart agents 130, parses the conversational data 105 received from the CCS 160 via the CCS conversation interface 121.

In one embodiment, the conversational data 105 is a part of a conversation, such as a statement or a dialog. In one embodiment, the parser module 131 parses data types.

In one embodiment, the data type parsing is based on a user's preference stored as user data 186 of the data management system 180. In one embodiment, the user data 186 includes data indicating a user's prior preferences. In one embodiment, one or more of the smart agents 130 utilizes a user's prior preferences, as indicated in user data 186, to analyze conversational data 105 and determine a user's meaning to a generate the correct response for the user.

In one embodiment, a user's current preference is determined through a machine-learning algorithm associated with one or more of the smart agents 130 using the user's prior preferences indicated in user data 186 and/or in transaction data 184. In one embodiment, one or more smart agents 130 provide an intelligent response based on feedback and a particular user's prior preferences.

As a specific illustrative example, one of the smart agents 130 may initially parse a term "income" to a P&L statement. However, the smart agent may learn through analysis of user data 186, transaction data 184, feedback, and the particular user's prior preferences, that the specific user repeatedly changes the base report from a P&L statement to an income tax report. Accordingly, the smart agent may learn that a particular user's use of the term "income" references an income tax report instead of a P&L statement.

As another example, a user preference may be that dates have a European format, such that the day precedes the month, and a date option smart agent of smart agents 130 would take such a user preference into account when parsing the conversational data 105.

In one embodiment, the parser module 131 parses data types of dates, integers, Booleans, strings, floats, characters and other data types as discussed herein, or as known in the art at the time of filing, or as developed, or becomes available, after the time of filing. In one embodiment, the parser module 131 parses enumerated data types defined by the data management system 180 as report customization option data 182. For example, an enumerated data type may be one of "cash" and "accrual" for accounting basis methods. In one embodiment, the parser module 131 parses conversational data 105 to a properly parsed data type.

In one embodiment, the parser module 131 utilizes other user's preference to parse the conversational data 105. In one embodiment, a user's preference is stored as user data 186. In one embodiment, the parser module 131 parses the conversational data 105 based on business terms defined by a company. For example, a business term may be a service, such as "tax preparation," that the company of a user provides to customers. For further example, a user may define a "customer" to be enumerated as a "client" of the service of "tax preparation," and the parser module 131 may parse the term "customer" to "client" under this example.

In one embodiment, the parser module 131 utilizes transaction data 184 stored in the transaction database 183 to parse the conversational data 105. For example, the conversational data 105 may include a customer name, a vendor name, or an account name that is stored as transaction data 184 in the transaction database 183. In one embodiment, the parser module 131 parses the conversational data 105 to an identifier (not shown) stored in the transaction data 184. For example, an identifier may correspond to a name of a vendor from which inventory was purchased.

In one embodiment, the parser module 131 corrects errors within the conversational data 105 as the conversational data 105 is parsed. For example, the parser module 131 may correct a misspelled word.

In one embodiment, the CCS 160 conducts an oral conversation with a user. In one embodiment, the CCS 160 transmits dialog of the oral conversation to the CRC system 120 as conversational data 105. In this embodiment, the CCS 160 parses oral dialog into text dialog and transmits the text dialog as conversational data 105. In this embodiment, the parser module 131 further parses the text dialog, that had been parsed from oral dialog, into pending customization data 141.

In one embodiment, the parser module 131 parses the conversational data 105 as pending customization data 141 of the shared memory module 140. In one embodiment, the shared memory module 140 comprises a blackboard data structure. In one embodiment, the shared memory module 140 stores data that is updated by at least one of smart agents 130. In one embodiment, the data of the shared memory module 140 is updated by appending data, modifying data, or deleting data. In one embodiment, the data of the shared memory module 140 is iteratively updated by at least one of smart agents 130. In one embodiment, the data of the shared memory module 140 represents a set of customizations for a report. In one embodiment, the data of the shared memory module 140 is represented as structured memory containing objects from the report customization option data 182 of the data management system 180.

In one embodiment, the validator module 132 of generic smart agent 191, and any of the smart agents 130, validates the pending customization data 141 that was stored by the parser module 131 in shared memory module 140.

In one embodiment, upon completion of the validation, the pending customization data 141 is stored by the validator module 132 as validated customization data 142 of the shared memory module 140. In one embodiment, the validator module 132 performs syntactic and/or semantic validation.

For example, the validator module 132 may validate that a dollar amount has two decimal places after a decimal. For further example, the validator module 132 may validate that a customer name is present in the transaction data 184 of the data management system 180. For further example, the validator module 132 may validate that an end date comes after a start date.

In one embodiment, the validator module 132 validates that the pending customization data 141 is applicable to available and relevant report customization option data 182. For example, the validator module 132 may determine that a request for vendors is not applicable to a sales report that is reporting on customers. For further example, the report customization option data 182 may indicate that a field is constrained to a range of values, and the validator module 132 validates that the pending customization data 141 is valid as to that range. For example, a numeric range in the report customization option data 182 may be the numbers one through four, and the validator module 132 would validate that a value is not less than one nor more than four.

In one embodiment, the validator module 132 validates that interdependencies between customizations of the pending customization data 141 are consistent. In one embodiment, the validator module 132 may validate that a first customization is valid in relation to a second customization. For example, a first customization may be a start date which may be validated by the validator module 132 to be earlier than a second customization of an end date.

In one embodiment, the mapper module 133 of generic smart agent 191, and any of the smart agents 130, maps the validated customization data 142 to a customization option defined in the report customization option data 182 of the data management system 180.

In one embodiment, the validated customization data 142 is updated based on the mapping. In one embodiment, the validated customization data 142 is mapped by the mapper module 133 to mapped customization data 143.

In one embodiment, the generator module 134 of generic smart agent 191, and any of the smart agents 130, generates response element data 144.

In one embodiment, the response element data 144 is generated from the mapped customization data 143. In one embodiment, the response element data 144 is generated from the validated customization data 142, such as when the mapper module 133 is not utilized by the smart agents 130.

In one embodiment, the response element data 144 represents at least one customization that defines data to be extracted from the transaction data 184 of the data management system 180. In one embodiment, the response element data 144 is formatted to be usable in a structured query language to extract data from the transaction data 184. In one embodiment, the response element data 144 represents report customization instructions to be carried out by the report module 181 of the data management system 180 to create a customized report. In one embodiment, when the response element data 144 does not provide instructions for a customization option, the default option for the report is utilized by the report module 181. In one embodiment, the default option of a report is represented as report customization option data 182.

In one embodiment, the generator module 134 of generic smart agent 191, and any of the smart agents 130, generates additional response elements and stores the additional response elements to the response element data 144. For example, a report of the data management system 180 may list invoices by invoice number, and the generator module 134 may generate the text of "All Dates" to be added to the report, such as the report's subtitle section.

In one embodiment, the response element data 144 is stored as a table. In one embodiment, such a table includes key-value pair data. In one embodiment, each key-value pair represents a customization of a report. For example, the key-value pair "START DATE=3/13/2018."

In one embodiment, the prompter module 135 of generic smart agent 191, and any of the smart agents 130, determines a prompt to be provided to a user of the data management system 180. In one embodiment, a prompt is stored as conversational data 105 that is transmitted to the CCS 160 via the CCS conversation interface 121. In one embodiment, the prompter module 135 determines a request to the user for additional information, such as additional information to configure a report. In one embodiment, such a request for additional information is based on prior conversational data 105 having been transmitted to the CRC system 120 and analyzed by smart agents 130. In one embodiment, the prompter module 135 determines a suggestion for the user, such as a suggestion for additional configuration of a report. In one embodiment, the prompt from the prompter module 135 is delivered to the user via the CUI 165 of the CCS 160.

In one embodiment, a prompt is a follow-up question from which an answer to the follow-up question enables the smart agent 130 to generate response element data 144. For example, after a user views a first P&L report, the CCS 160 may transmit first conversational data 105 to the CRC system 120, in which the first conversational data 105 represents a user's utterance of "I want to compare that." In this example, the CCS engine 162 may have recognized the word "compare" and accordingly transmitted the first conversational data 105 to an add sub-columns for comparison smart agent 130. In this example, after the parser module 131 of the add sub-columns for comparison smart agent 130 parses the utterance contained in the first conversation, the validator module 132 of the add sub-columns for comparison smart agent 130 may determine that the utterance is missing what is to be compared. In this example, the prompter module 135 of the add sub-columns for comparison smart agent 130 determines a prompt of a follow-up question of "Do you want to show the percent change for the previous year?" In this example, the prompt is transmitted as second conversational data 105 to the CCS 160 that provides the prompt to the user via the CUI 165. In this example, the CCS 160 receives from the user an answer of "Yes" and transmits the answer as conversational data 105 to the add sub-columns for comparison smart agent 130. In this example, the generator module 134 of the add sub-columns for comparison smart agent 130 now has sufficient information to generate response element data 144, such as a key-value pair of "COMPARISON=% CHANGE LAST YEAR."

In one embodiment, the serializer module 136 of generic smart agent 191, and any of the smart agents 130, serializes data stored in the shared memory module 140.

As used herein, the terms "serializing," "serialize," "deserializing," and "deserialize" include, but are not limited to, translating data from one format to another. In one embodiment, serializing data transforms data from a first format to a second format. In one embodiment, deserializing data transforms the data from the second format to the first format. In one embodiment, serializing and deserializing data changes the syntactics, i.e., the structure, of the data without changing the semantics, i.e., the meaning.

In one embodiment, the serialization by the serializer module 136 transforms data from a deserialized format to a serialized format. In one embodiment, the serializer module 136 deserializes data retrieved from the shared memory module 140. In one embodiment, the deserialization by the serializer module 136 transforms data from a serialized format to a deserialized format. In one embodiment, the serializer module 136 serializes and deserializes conversation context.

In one embodiment, smart agents 130 are stateless. In one embodiment, it is the shared memory module 140 that maintains the states. In one embodiment, the serializer module 136 serializes a state into the shared memory module 140, such as into the response element data 144. In one embodiment, the serialized state of the shared memory module 140 is utilized as the underlying data structures.

As an illustrative example, the report customization option data 182 of the data management system 180 may comprise an option of header alignment of left represented as "1," middle represented as "2," and right represented as "3." However, a header alignment option smart agent 130 may generate response element data 144 in which left is represented as "L," middle is represented as "M," and right is represented as "R." In this example, if the generator module 134 of the header alignment option smart agent 130 generates response element data comprising a key-value pair of "HEADER ALIGNMENT=R," the serializer module 136 of the header alignment option smart agent 130 serializes the key value pair to a format compatible to the report customization option data 182, such as "HEADER ALIGNMENT=3." Further in this example, the serializer module 136 can deserialize report customization option data 182 of "HEADER ALIGNMENT=3" to a formatted key-value pair of "HEADER ALIGNMENT=R."

In one embodiment, each of the smart agents 130 collectively generate response element data 144 associated with their assigned report customization data.

In one embodiment, the collectively generated response element data 144 from all smart agents 130 represent a set of discrete customizations, such as customizations that apply to report customization options represented in the report customization option data 182 of the data management system 180. In one embodiment, the response element data 144 includes customization information that represent a user's answers to questions in a conversation represented by the conversational data 105.

In one embodiment, the response element data 144 represents customizations that can be applied to a report of the data management system 180. In one embodiment, the response element data 144 is transmitted to the report module 181 of the data management system 180 via the report interface module 125. In one embodiment, the report module 181 utilizes the response element data 144 to generate a report for the user. In one embodiment, the report is transmitted to the user system 103 via the data management system user interface module 185 of the data management system 180, such as by displaying the report on a graphical user interface. In one embodiment, the report, or a portion of the report, is transmitted to the user system 103 via the CUI 165, such as by delivering a short message that indicates information from the report.

In one embodiment, the report interface module 125 enables a user to save response element data 144 as a memorized report represented by the memorized report data 126 of the report interface module 125. In one embodiment, a user may customize a report through response element data 144 and may save the customizations as memorized report data 126. In one embodiment, the report interface module 125 may receive a label for the memorized report and associate the label to the memorized report. In one embodiment, such a label references a set of customizations defined by a user, such as customizations defined as response element data 144. For example, after a user defines a set of customizations for a P&L statement, the user may label such customizations as "income without accessories." In one embodiment, the user may dialog with the CCS 160 regarding "income without accessories," and when such is transmitted as conversational data 105 to the CRC system 120, the report interface module 125 adds the associated saved customizations from the memorized report data 126 to the current response element data 144. In one embodiment, the memorized report data 126, which represents the context of a prior conversation with a user, is added to the shared memory module 140 as response element data 144 so that a user can customize a report further by requesting additional customizations through additional conversational data 105. Under this example, the user can then have further dialog to modify the customizations to further meet the user's expectations for a customized report.

In one embodiment, the report interface module 125 enables a user to invent a new term for report customizations. In one embodiment, the new term is stored in the memorized report data 126. In one embodiment, the new term is a label for a set of customizations of a report. In one embodiment, the new term is shared with other users of the data management system 180. In one embodiment, a new term is utilized by smart agents 130 to understand a user's query. In one embodiment, a user provides a report formula for deriving a new term. For example, a user may provide a formula for a report that determines average income per employee, which may be based on a combination of a report for income and a report for employees. In one embodiment, a new term that is available to other users results in a new report being made available to a plurality of users of the data management system 180. In one embodiment, a user can contribute a new report to the data management system 180 via the memorized report data 126 of the report interface module 125, which is based on at least one smart agents 130.

Figure 1C:
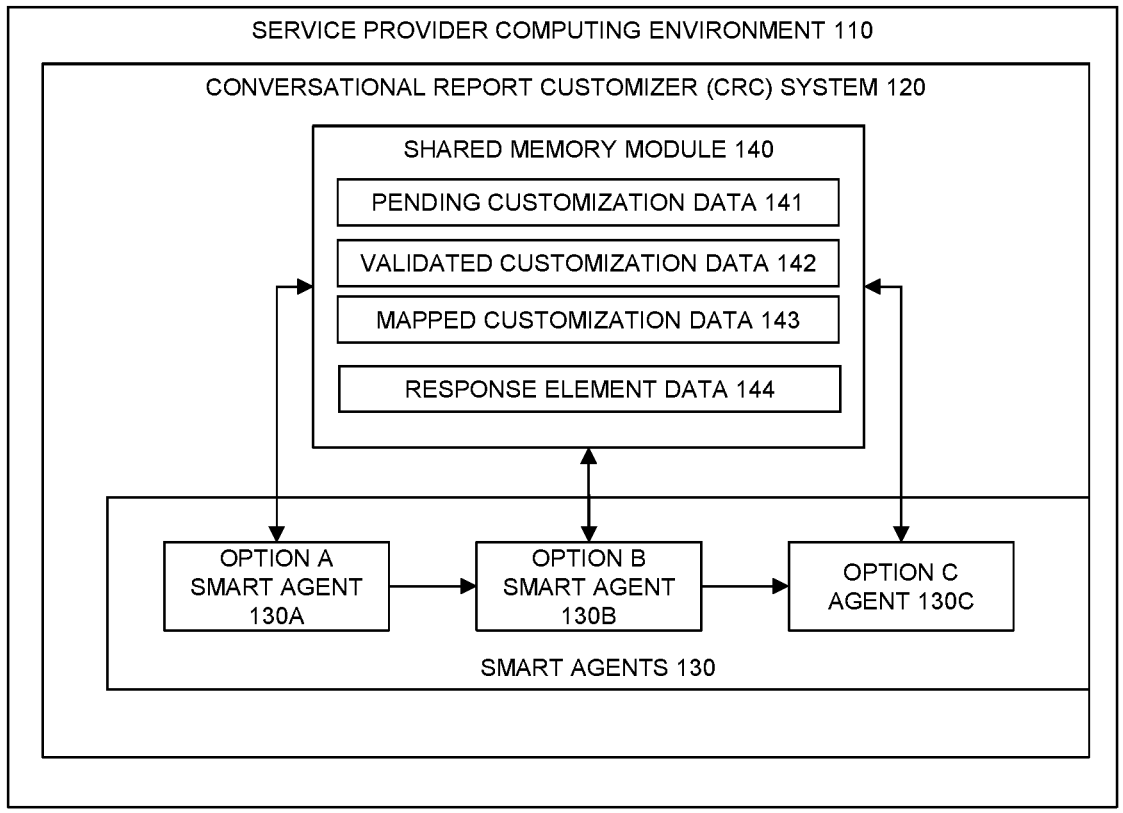
FIG. 1C is a functional block diagram of a portion of the production environment of FIG. 1A for conversational report customization, in accordance with one illustrative embodiment.

FIG. 1C is a functional block diagram of a portion of production environment 100 of FIG. 1A for conversational report customization, in accordance with one illustrative embodiment. Referring to FIGS. 1A, 1B, and 1C together, CRC system 120 includes the shared memory module 140 and a plurality of smart agents 130, i.e., option A smart agent 130A, option B smart agent 130B, and option C smart agent 130C. Though not depicted in FIG. 1C, it is to be understood that the CRC system 120 may have any number of smart agents 130.

In one embodiment, a conversation between a user and the CCS 160 entails the use of a plurality of smart agents 130. In one embodiment, a first smart agent, such as option A smart agent 130A, receives respective conversational data 105 associated with report customization option A, and generates respective response element data 144 for report customization option A that is stored at the shared memory module 140.

Thereafter, in one embodiment, a second smart agent, option B smart agent 130B, receives respective conversational data 105 associated with report customization option B, and generates respective response element data 144 associated with report customization option B that is stored at the shared memory module 140.

Thereafter, in one embodiment, a third smart agent, option C smart agent 130C receives respective conversational data 105 associated with report customization option C and generates respective response element data 144 associated with report customization option C that is stored at the shared memory module 140.

Thereafter, in one embodiment, the respective response element data 144 is combined and transmitted to the report module 181 of the data management system 180 for creation of a customized report for the user. In one embodiment, response element data 144 is represented by a table, and each row in the table stores the respective generated response element of each respective smart agent 130.

In one embodiment, the smart agents included in smart agents 130 are executed in real-time or near-real-time. In one embodiment, the smart agents included in smart agents 130 can be executed in a non-linear fashion. In one embodiment, the smart agents included in smart agents 130 can executed in a linear fashion. In one embodiment, certain smart agents can be interdependent. As a specific illustrative example, option B smart agent 130B may be interdependent on option A smart agent 130A. This may dictate that option B smart agent 130B and option A smart agent 130A be linked for validation and execution purposes.

For example, if option B smart agent 130B were associated with an end date customization option and option A smart agent 130A were associated with a start date customization option, option B smart agent would depend option A smart agent 130A for validation in comparing two dates of a date range, i.e., to confirm/validate that the start date is before the end date.

In one embodiment, each of the smart agents included in smart agent 130 is associated with a report customization option for a report of transaction data 184 of the data management system 180. In one embodiment, such report customization options are represented by the report customization option data 182 of the report module 181.

In one embodiment, a given smart agent of smart agents 130 may be executed several times for one conversation. For example, a user may have a conversation with a CCS through the CUI 165. The user may query: "Get me all transactions with account details." Under this example, the CRC system 120 receives the user query as conversational data 105, and analyzes such with a first smart agent, such as option A smart agent 130A, that is a transaction detail by account option smart agent and generates response element data 144 of "REPORT=TRANSACTION-DETAIL-BY-ACCOUNT" and displays the report to the user.

Thereafter, under this example, the user may query: "Accounts receivable." Under this example, the CRC system 120 receives the second user query as conversational data 105, and analyzes such with a second smart agent, such as option B smart agent 130B, a filter by account type smart agent that generates response element data 144 of "FILTERS: ACCOUNT-TYPE=AR" and displays the customized report to the user.

Thereafter, under this example, the user may query: "Opening balance equity." Under this example, the CRC system 120 receives the third user query as conversational data 105, and analyzes this data with a second application of the second smart agent, such as option B smart agent 130B, a filter by account type smart agent that generates response element data 144 of "FILTERS: ACCOUNT-TYPE=OBE," which overwrites the prior response element data 144 related to accounts receivable, and the new customized report is displayed to the user.

Thereafter, under this example, the user may query: "Include commissions." Under this example, the CRC system 120 receives the fourth user query as conversational data 105, and again utilizes the second smart agent, such as option B smart agent 130B, a filter by account type smart agent to analyze the data and generate response element data 144 of "FILTERS: ACCOUNT-TYPE=OBE&COM," which appends commission to the prior response element data 144 related to opening balance equity, and the new customized report is displayed to the user.

It is to be understood that, under this example, a report may be generated after any of smart agents 130 is executed based on the current state of customizations reflected in the response element data 144. In this way intermediate reports can be created by the data management system 180 with each modification to the shared memory module 140, without having to store multiple reports in their entirety.

In one embodiment, the shared memory module 140 includes a validator coordination module (not shown) that causes a plurality of smart agents 130 to execute their respective validator modules 132 against the pending customization data 141 and coordinates a validation of all pending validation data in the shared memory module 140. In one embodiment, the execution of the respective validator modules 132 is performed in parallel.

In one embodiment, the shared memory module 140 requires each of the respective validator modules 132 to provide a validation of the pending customization data 141 before the pending customization data 141 is put in the validated customization data 142 of the shared memory module 140. In one embodiment, the shared memory module 140 requests validation from a plurality of validator modules 132 of respective smart agents 130 when the pending customization data 141 changes. In one embodiment, all data of the shared memory module 140 is accessible by all of the smart agents 130.

Figure 1D:
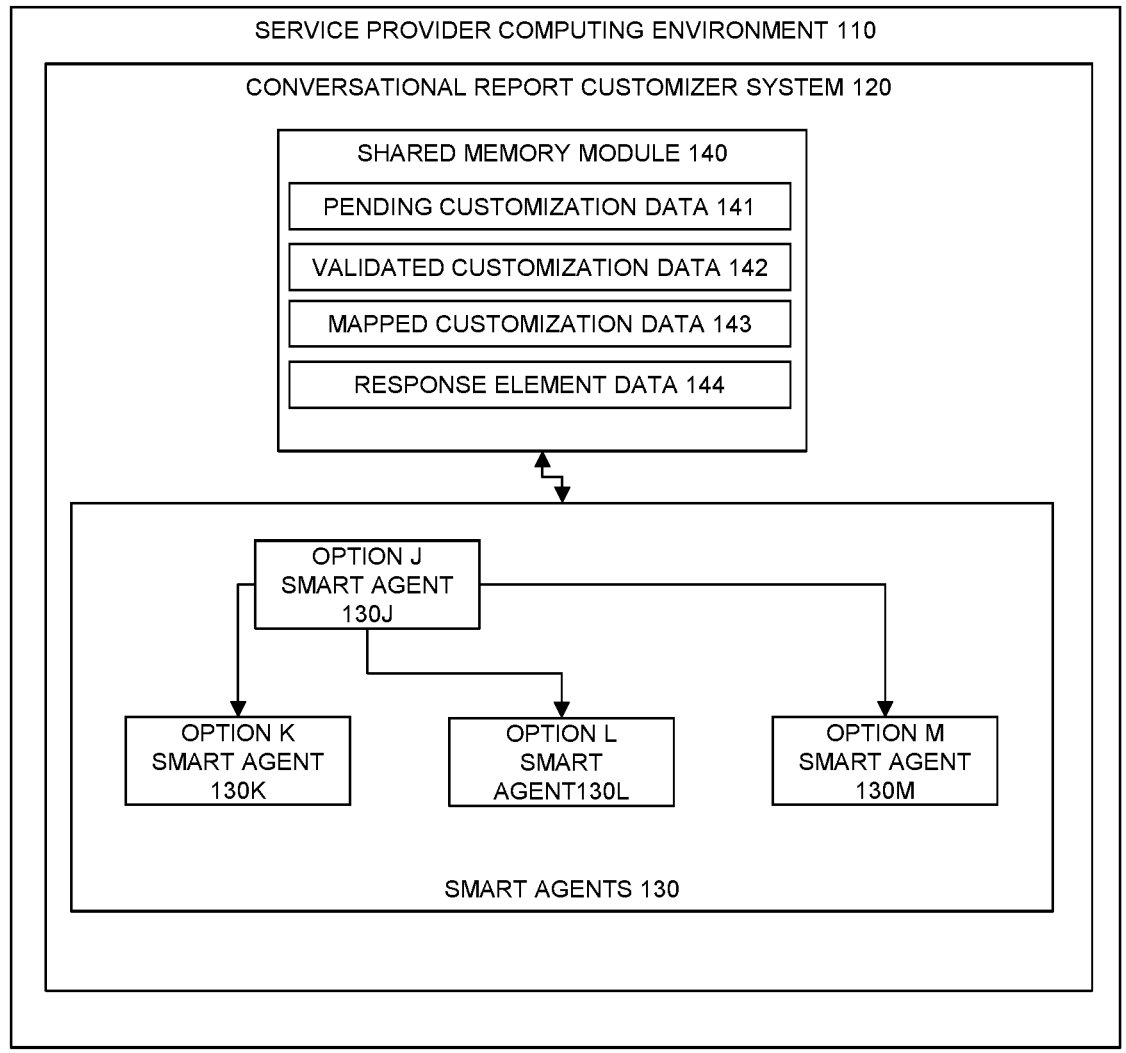
FIG. 1D is a functional block diagram of a portion of the production environment of FIG. 1A for conversational report customization, in accordance with one illustrative embodiment.

FIG. 1D is a functional block diagram of a portion of production environment 100 of FIG. 1A for conversational report customization, in accordance with one illustrative embodiment.

Referring to FIGS. 1A, 1B, 1C, and 1D together, the CRC system 120 includes the shared memory module 140 and a plurality of smart agents 130, i.e., option J smart agent 130J, option K smart agent 130K, option L smart agent 130L, and option M smart agent 130M. Though not depicted in FIG. 1D, it is to be understood that the CRC system 120 may have any number of smart agents 130.

In one embodiment, a conversation between a user and the CCS 160 entails the use of a plurality of smart agents 130 i.e., option J smart agent 130J, option K smart agent 130K, option L smart agent 130L, and option M smart agent 130M. In one embodiment, option J smart agent 130J receives respective conversational data 105 associated with report customization option J and generates respective response element data 144 associated with report customization option J, that is stored at the shared memory module 140. In one embodiment, response element data 144 is represented by a table, and each row in the table stores the respective generated response element of each respective smart agent 130. Thereafter, option J smart agent 130J is used as a control, or uber, smart agent to determine that one or more of smart agents 130K, 130L, and 130M is to be executed. In one embodiment, such a determination is a delegation by option J smart agent 130J to other smart agents 130.

As a specific illustrative example of smart agent delegation, it is stipulated that report customization option J is a "filter-by" option and that option J smart agent 130J is a "filter-by smart agent" that analyzes dialogs related to including terms and excluding terms. In this example, the filter-by smart agent 130J may receive conversational data 105 of "exclude John." In this example, the filter-by smart agent 130J determines whether the term "John" refers to a customer, a vendor, or a product.

In this specific illustrative example it is further stipulated that: report customization option K is a "filter-by-customer" report customization option and that option K smart agent 130K is a "filter-by-customer smart agent"; option L is a "filter-by-vendor" report customization option and that option L smart agent 130L is a "filter-by-vendor smart agent"; and option M is a "filter-by-product" report customization option and that option M smart agent 130M is a "filter-by-product smart agent."

In one embodiment, the filter-by smart agent 130J may delegate a filter-by-customer function to option K smart agent 130K, thereby designating option K smart agent 130K as the filter-by-customer smart agent 130K. In this example, the filter-by smart agent 130J may delegate a filter-by-vendor function to option L smart agent 130L, thereby designating option L smart agent 130L as the filter-by-vendor smart agent 130L. In this example, the filter-by smart agent 130J may delegate a filter-by-product function to option M smart agent 130M, thereby designating option M smart agent 130M as the filter-by-product smart agent 130M.

In this example, the filter-by smart agent 130J may then determine that "John" is a customer when the report being queried by the user is a sales report, and accordingly delegate to the filter-by-customer smart agent 130K. Alternatively, in this example, the filter-by smart agent 130J may determine that "John" is a vendor when the term John can be found as a vendor within the transaction database 183 of the data management system 180, and accordingly delegate to the filter-by-vendor smart agent 130L.

As another example, in one embodiment, FIG. 1D illustrates a hierarchy of smart agents 130. In one embodiment, option J smart agent 130J receives respective conversational data 105 associated with report customization option J and generates respective response element data 144 associated with report customization option J that is stored in the shared memory module 140. Thereafter, the option J smart agent 130J determines that one or more of smart agents 130K, 130L, and 130M is to be executed. In one embodiment, such determination defines a hierarchy of a smart agents 130.

As an example of smart agent hierarchy, report customization J may be a date report customization option and option J smart agent 130J may be a date smart agent. In this specific illustrative example, it is stipulated that report customization option K is a date-range report customization option and smart agent 130K is a date-range smart agent 130K.

In this specific illustrative example, the date smart agent 130J may generate a date as pending customization data 141. Thereafter, in this example, the date smart agent 130J determines that date range smart agent 130K is to be executed and is to analyze the parsed date, as parsed by the date smart agent 130J. Accordingly, the date-range smart agent 130K generates a start date and end date as a date range. In this example, the date-range smart agent 130K may determine a date range such as "this fiscal year to date" as a date range.

In one embodiment, various smart agents 130 may overwrite the data of other smart agents 130, for example, based on hierarchies of smart agents 130. In one embodiment, a customization stored in the shared memory module 140 may be deleted if another dependent customization is added.

As a specific illustrative example, it is stipulated that: report customization option J is a base report type report customization option and smart agent 130J is a base report type smart agent 130J; report customization option K is an accounting basis report customization option and smart agent 130K is an accounting basis smart agent 130K; report customization option L is a date range report customization option and smart agent 130L is a date range smart agent 130L; and report customization option M is a transaction type report customization option and smart agent 130M is a transaction type smart agent 130M.

In this specific illustrative example, a user may have a conversation with the CCS 160 through the CUI 165. The user may query: "Get me a report that shows my money-out transactions." Under this example, the CRC system 120 receives the user query as conversational data 105 and analyzes such with base report type smart agent 130J that generates response element data 144 of "REPORT=TRANSACTION-DETAIL-BY-ACCOUNT" and displays the report to the user.

In this example, the default for the report, as determined by the analysis of report customization option data 182, is the accounting method of cash basis, and accordingly accounting basis smart agent 130K is executed. Under this example, accounting basis smart agent 130K may determine that the accounting method is cash basis and generate response element data 144 of "BASIS=CASH."

Thereafter, under this example, the user may query: "Last year." Under this example, the CRC system 120 receives the second user query as conversational data 105 and analyzes such with date range smart agent 130L that generates response element data 144 of "TIME-PERIOD=LAST-YEAR" and displays the customized report to the user.

Thereafter, under this example, the user may query: "Show unpaid bills as well." Under this example, the CRC system 120 receives the third user query as conversational data 105 and analyzes such with two smart agents; transaction type smart agent 130M and accounting basis smart agent 130K. Under this example, transaction type smart agent 130M generates response element data 144 of "FILTERS: TRANSACTION-TYPE=UNPAID-BILLS." In addition, under this example, accounting basis smart agent 130K generates response element data 144 of "BASIS=ACCRUAL." This data of accounting basis smart agent 130K overwrites the prior cash basis configuration, because unpaid bills cannot be displayed on a report with an accounting method of cash basis. In one embodiment, such a determination of "BASIS=ACCRUAL." may be made by the validator module 132 of accounting basis smart agent 130K. Under this example, with the execution of the accounting basis smart agent 130K and transaction type smart agent 130M, the new customized report is displayed to the user.

Exemplary Process

Figure 2:
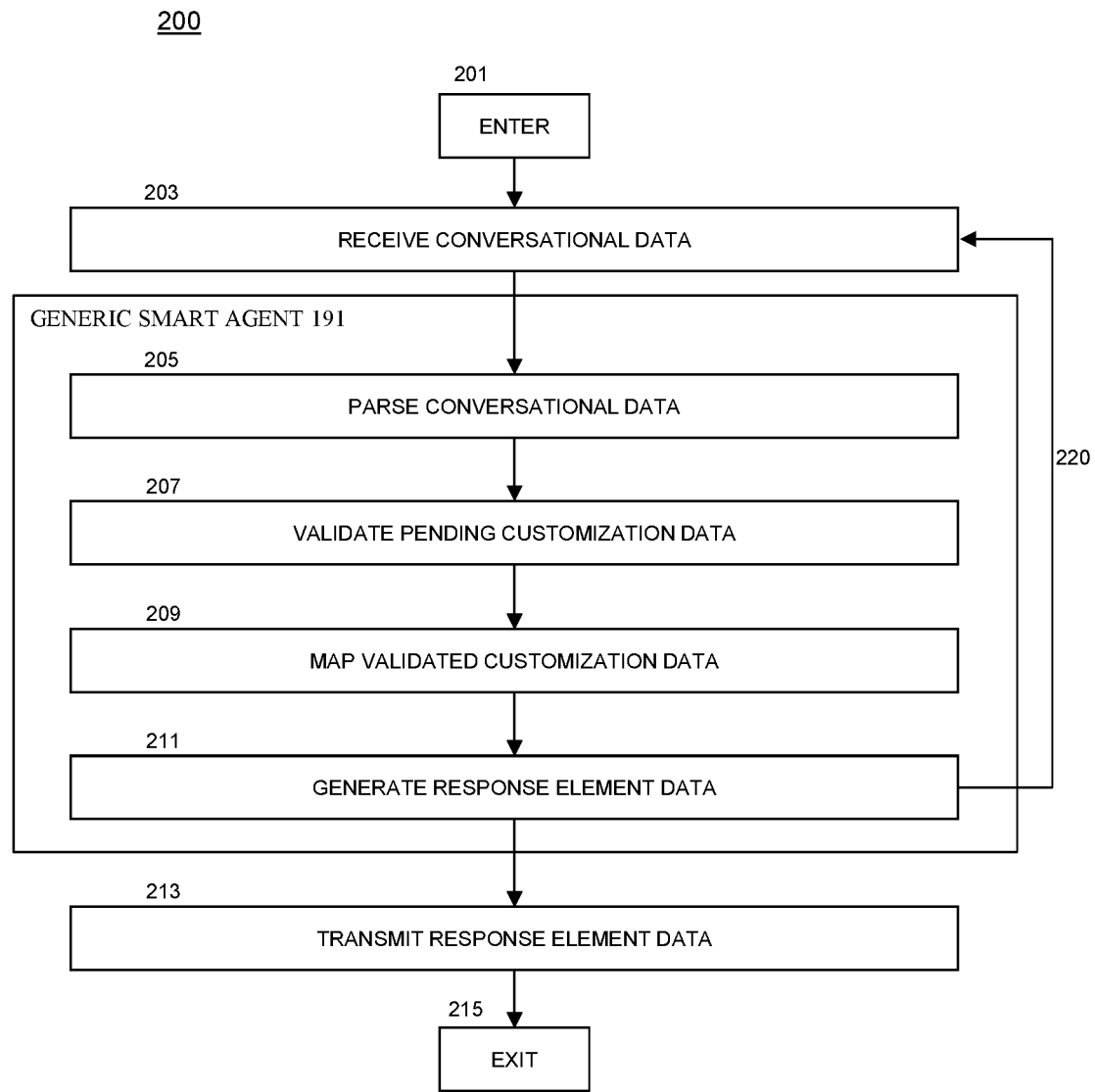
FIG. 2 is a flow diagram of a process for conversational report customization, in accordance with one embodiment.

FIG. 2 is a flow diagram of a process 200 for conversational report customization, in accordance with one embodiment. Referring to FIGS. 1A, 1B, 1C, and 2 together, the process 200 for conversational report customization begins at ENTER OPERATION 201 and process flow proceeds to RECEIVE CONVERSATIONAL DATA OPERATION 203.

In one embodiment, at RECEIVE CONVERSATIONAL DATA OPERATION 203, the CCS conversation interface module 121 of the CRC system 120 receives conversational data 105 from the CCS 160 as discussed above with respect to FIG. 1A. In one embodiment, the conversational data 105 is received by CRC system 120 as a series of interactions between the CCS 160 and a user of a user system 103 via a CUI 165. In one embodiment, the conversation with the user system 103 is conducted via the data management system user interface module 185 of the data management system 180. In one embodiment, the CCS engine 162 of the CCS 160 includes Natural Language Understanding (NLU) models stored as CCS data 163. In one embodiment, the NLU models are capable of mapping a user's utterance to an intent. For example, an utterance may be a user's textual request for customizing a report, and the corresponding intent is the creation of a report, thus requiring the use of the CRC system 120.

In one embodiment, the CRC system 120 maintains conversation contexts with the CCS 160. In one embodiment, a conversation includes one or more dialogs, such as dialogs between a CCS and a user. In one embodiment, the RECEIVE CONVERSATIONAL DATA OPERATION 203 is executed multiple times throughout a conversation with a user. In one embodiment, a first execution of the RECEIVE CONVERSATIONAL DATA OPERATION 203 is to receive an intent of the user. In this embodiment, a second execution of the RECEIVE CONVERSATIONAL DATA OPERATION 203 is to receive a first slot of the user. In this embodiment, a third execution of the RECEIVE CONVERSATIONAL DATA OPERATION 203 is to receive a second slot of the user. For example, an intent of the user may be the creation of a report, the first slot may be the time period of the report, and the second slot may be a basis of accounting selection of cash or accrual method of the report.

In one embodiment, once the conversational data 105 is received by the CCS conversation interface 121, and CRC system 120, at RECEIVE CONVERSATIONAL DATA OPERATION 203, process flow proceeds to PARSE CONVERSATIONAL DATA OPERATION 205.

In one embodiment, at PARSE CONVERSATIONAL DATA OPERATION 205, the conversational data 105 is parsed to form pending customization data 141 as discussed above with respect to FIGS. 1A and 1B. In one embodiment, the PARSE CONVERSATIONAL DATA OPERATION 205 is performed by the relevant smart agents of smart agents 130.

In one embodiment, the CRC system 120 includes a plurality of smart agents included in smart agents 130, such as the smart agent 130A, the smart agent 130B, and the smart agent 130C. In one embodiment, each of the smart agents included in smart agents 130 acts independently from the other smart agents of smart agents 130. In one embodiment, each of the relevant smart agents of smart agents 130 parses the conversational data 105 into a report customization as discussed above with respect to FIGS. 1A and 1B. In one embodiment, a report customization is a filter that restricts data that is displayed on a report. For example, a report that includes national sales data may be filtered to a city, such as Dallas, by restricting the sales data in the report to sales within Dallas.

In one embodiment, the parsed conversational data 105 is stored as pending customization data 141. In one embodiment, the parsed data of the pending customization data 141 is in the form of strict data types. In one embodiment, the parser module 131 parses data types including dates, integers, Booleans, strings, floats, characters and other data types as discussed herein, or as known in the art at the time of filing, or as developed, or becomes available, after the time of filing. In one embodiment, the parser module 131 parses business terms. For example, the parser module 131 may parse the term "basis" such as an accrual method and a cash method. Under this example, a user may desire to select an accounting basis for a report.

In one embodiment, the parser module 131 may parse user data, such as company data of the user. In one embodiment, a user of a data management system 180 may be associated with company data stored as transaction data 184 in the transaction database 183. In one embodiment, the transaction data 184 includes domain data of the user, such as domain specific names. For example, a first domain may be related to a financial management system and a second domain may be related a tax management system. In one embodiment, a domain specific name is a term from the transaction data 184. For example, the transaction data 184 may include sales data for specific customers, and a domain specific name may be a customer name, such as ABC Corp. In this embodiment, the parser module 131 can parse a customer name in order to apply that customer name as a filter to a report.

In one embodiment, the parser module 131 of the smart agents 130 parses conversational data 105, such as contextual conversations and CCS dialogs, into pending customization data 141 of the shared memory module 140. In one embodiment, each dialog between a CCS and a user, including follow-up dialogs, are parsed by the parser module 131.

In one embodiment, once the conversational data 105 is parsed by the parser module 131 at PARSE CONVERSATIONAL DATA OPERATION 205, process flow proceeds to VALIDATE PENDING CUSTOMIZATION DATA OPERATION 207.

In one embodiment, at VALIDATE PENDING CUSTOMIZATION DATA OPERATION 207, the validator module 132 of the smart agents 130 validates the pending customization data 141 of the shared memory module 140, as discussed above with respect to FIGS. 1A and 1B. In one embodiment, the pending customization data 141 that is validated by the validator module 132 is stored as validated customization data 142 of the shared memory module 140.

In one embodiment, the validator module 132 performs a validation that a customization of a report is an allowed customization. In one embodiment, a validation includes checking for a range of values. For example, if a company has three offices indicated in the transaction data 184, the validator module 132 will validate that the user is not requesting information about a fourth office, as such would not be included in the transaction data 184 under this example.

In one embodiment, the validator module 132 validates for validated interdependent customizations of a report. In one embodiment, a first customization of a report may be interdependent on a second customization of the report. For example, a first customization may be a start date and a second customization may be an end date, and the start date and end date may be interdependent on each other. For example, the end date may be validated to be greater than the start date. In one embodiment, a report customization is based on an enumerated list, and the validator module 132 validates that the customization described by the user in the conversational data 105 is one of the customizations from the enumerated list. For example, a customization of a report may include an enumerated list of landscape and portrait modes, and the validator module 132 validates that one of these two modes was described by the user.

In one embodiment, once the pending customization data 141 is validated by the validator module 132 at VALIDATE PENDING CUSTOMIZATION DATA OPERATION 207, process flow proceeds to MAP VALIDATED CUSTOMIZATION DATA OPERATION 209.

In one embodiment, at MAP VALIDATED CUSTOMIZATION DATA OPERATION 209, the mapper module 133 of the smart agents 130 maps the validated customization data 142 to report options defined by the data management system 180, as discussed above with respect to FIGS. 1A and 1B. It is to be understood that instead of mapping validated customization data 142, in one alternative embodiment, the mapper module 133 maps pending customization data 141, thus the VALIDATE PENDING CUSTOMIZATION DATA OPERATION 207 is optional in the process 200. In one embodiment, the mapping of the validated customization data 142 is stored in the shared memory module 140 as mapped customization data 143.

In one embodiment, the mapper module 133 receives report customization option data 182 of the report module 181 of the data management system 180. In one embodiment, the mapper module 133 utilizes the report customization option data 182 to determine a mapping of the validated customization data 142 to the mapped customization data 143. In one embodiment, the mapping of the mapper module 133 maps a report customization to an available option for customizing the report.

In one embodiment, the mapper module 133 maps a conversation to a specific report. In one embodiment, a first dialog is received as conversational data 105 at RECEIVE CONVERSATIONAL DATA OPERATION 203. In one embodiment, the first dialog is a user intent for a customized report. In one embodiment, determining that a report is the intent of a user is conducted as a first step by a first smart agent 130A. For example, a first dialog may be a user requesting total assets for a company. In this example, the mapper module 133 determines that information about a company's assets is found in a balance sheet report called Balance Sheet Summary. In this example, the mapper module 133 may map the request for total assets to the Balance Sheet Summary report.

In one embodiment, the mapper module 133 maps a user's answer to a question to a customization of a report. Continuing with the prior example, after a first smart agent of smart agents 130 determines that a report is Balance Sheet Summary, the CCS conversation interface 121 may receive additional conversational data 105 in response to a follow-up question to the user about the time period of the report. The user may have responded with text of "this year," and the mapper module 133 may map that user response to a date customization of the Balance Sheet Summary. In one embodiment, the mapping of customizations includes a key field and a value field. In the previous example, the mapper module 133 may map the user's response of "this year" to a key of DATE-MACRO and a value of YEAR-TO-DATE. In one embodiment, a key and an associated value is stored as mapped customization data 143.

In one embodiment, once the validated customization data 142 is mapped by the mapper module 133 at MAP VALIDATED CUSTOMIZATION DATA OPERATION 209, process flow proceeds to GENERATE RESPONSE ELEMENT DATA OPERATION 211.

In one embodiment, at GENERATE RESPONSE ELEMENT DATA OPERATION 211, the generator module 134 of the smart agents 130 generates response element data 144 from the mapped customization data 143 as discussed above with respect to FIGS. 1A and 1B. It is to be understood that instead of generating response element data 144 from the mapped customization data 143, in one alternative embodiment, the generator module 134 generates response element data 144 from the validated customization data 142, thus the MAP VALIDATED CUSTOMIZATION DATA OPERATION 209 is optional in the process 200. In one other alternative embodiment, the generator module 134 generates response element data 144 from the pending customization data 141, thus the VALIDATE PENDING CUSTOMIZATION DATA OPERATION 207 is optional in the process 200.

In one embodiment, the response element data 144 represents key-value pair data representing pairs of keys and associated values. For example, if a key is DATE-MACRO and a value is YEAR-TO-DATE, then a key-value pair may be represented as DATE-MACRO=YEAR-TO-DATE. In one embodiment, the response element data 144 represents more than one key-value pair. For example, a first smart agent, such as option J smart agent 130J of smart agents 130 may generate a first key-value pair, such as REPORT-TYPE=BALANCE-SHEET-SUMMARY; a second smart agent, such as option K smart agent 130K, may generate a second key-value pair, such as DATE-MACRO=YEAR-TO-DATE; and a third smart agent, such as option L smart agent 130L, may generate a third key-value pair, such as BASIS-ACCOUNTING=ACCRUAL-METHOD, in which each of the key-value pairs are generated by a respective generator module 134 and each key-value pair is stored as response element data 144.

In one embodiment, after the generator module 134 generates response element data 144, the prompter module 135 of the smart agents 130 prompts the user for more information. In one embodiment, such prompting is represented in FIG. 2 with the arrow 220 going from the GENERATE RESPONSE ELEMENT DATA OPERATION 211 to the RECEIVE CONVERSATIONAL DATA OPERATION 203. It is to be understood that such process flow is optional to the process 200.

In one embodiment, the CRC system 120 customizes a result for a user by encouraging the user to keep a conversation contextual by providing one or more follow-up questions. In one embodiment, the follow-up questions include suggestions for customizations, including filters and groupings. In one embodiment, such contextual suggestions are based on the report chosen by a first smart agent, such as option A smart agent 130A. For example, after first smart agent 130A determines that a user is requesting a balance sheet summary report, the prompter module 135 of the first smart agent 130A may prompt for a time period, and under this example, additional conversational data 105, for example of "this year," may be received at RECEIVE CONVERSATIONAL DATA OPERATION 203.

In one embodiment, the prompter module 135 of first smart agent 130A prompting for additional information may cause the prompter module 135 of a second smart agent, such as option B smart agent 130B, to prompt again for additional information, and so on.

For example, a first smart agent, such as option A smart agent 130A that receives a start date may, via the respective prompter module 135, request an end date based on the validator module 132 determining that an end date is required to compliment a start date for a report. After the end date is received, a second smart agent, such as option B smart agent 130B, may validate the end date with the respective validator module 132 and determine that the end date is before the start date, and consequently request again for an end date. Then, under this example, a third smart agent, such as option C smart agent 130C, may receive a correct end date. Under this example, the generator module 134 of the first smart agent 130A may generate a key-value pair of START-DATE=1/1/2017. Under this example, the generator module 134 of the second smart agent 130B may generate a key value pair of END-DATE=1/1/2016, which is invalid. Under this example, the generator module 134 of the third smart agent 130C may generate a key-value pair of END-DATE=12/31/2017, which overwrites the prior key-value pair as a valid end date.

In one embodiment, if a user desires to get results for a different date period, the user can submit a new start date, such as Jan. 1, 2016, which is added to the pending customization data 141 by the parser module 131. After validations are performed by the validator module 132, the new start date replaces the old start date, such as Jan. 1, 2017. For example, the generator module 134 may generate a key-value pair of START-DATE=1/1/2016 that overwrites the old key-value pair of START-DATE=1/1/2017 in the response element data 144 of the shared memory module 140.

In another example, the conversational data 105 may indicate that the user of the data management system 180 requests a comparison of current year data with last year data. In this example, the prompter module 135 of the applicable smart agents 130 may prompt a follow-up question asking the user to choose an absolute difference or a percentage difference on the report of date comparisons.

In one embodiment, a plurality of smart agents 130 enable a deep contextual conversation with the user. In one embodiment, a deep contextual conversation includes a plurality of customizations added to the pending customization data 141. In one embodiment, each follow-up question from the prompter module 135 results in a corresponding answer from the user, and each answer, such as a filter or a customization, is added to the pending customization data 141.

In one embodiment, a deep contextual conversation with a user may entail one or more customizations being overwritten during the course of a conversation flow. It is to be understood that, with such deep contextual conversations, certain customization values may be closely coupled with other customization values, which may limit the set of values that would be allowed for the closely coupled customizations.

For example, if a first smart agent, such as option A smart agent 130A generates a key-value pair for unpaid bills, the validator module 132 of a second smart agent, such as option B smart agent 130B would not allow a cash basis for a report because the unpaid bills would appear only with a report created under an accrual basis.

In one embodiment, the prompter module 135 retrieves report customization option data 182 from the report module 181 of the data management system 180. In one embodiment, the report customization option data 182 includes report definitions for a report that include available options for the report. Such options can be used by the prompter module 135 to determine report suggestions for a user. For example, the prompter module 135 may prompt the user through buttons, checkboxes, dropdown boxes, calendars, and other input visualizations as discussed herein, or as known in the art at the time of filing, or as developed, or becomes available, after the time of filing.

In one embodiment, after the generator module 134 generates the response element data 144, the serializer module 136 of each of the relevant smart agents 130A serializes the response element data 144 stored in the shared memory module 140 as discussed above with respect to FIGS. 1A and 1B. In one embodiment, after the generator module 134 generates the response element data 144, the serializer module 136 deserializes the response element data 144 stored in the shared memory module 140 as discussed above with respect to FIGS. 1A and 1B.

For example, an old customization that is to be overwritten is deserialized by the serializer module 136 and a new customization that replaces the old customization is serialized by the serializer module 136.

In one embodiment, a serializer module 136 serializes the data stored in the shared memory module 140, such as the pending customization data 141, the validated customization data 142, the mapped customization data 143, and the response element data 144.

In one embodiment, once the response element data 144 is generated by the generator module 134 at GENERATE RESPONSE ELEMENT DATA OPERATION 211, process flow proceeds to TRANSMIT RESPONSE ELEMENT DATA OPERATION 213.

In one embodiment, at TRANSMIT RESPONSE ELEMENT DATA OPERATION 213, the report interface module 125 transmits the response element data 144 to the report module 181 of the data management system 180. In one embodiment, the report module 181 of the data management system 180 creates reports based on data retrieved from the transaction data 184 of the transaction database 183. In one embodiment, the report module 181 receives response element data 144 that contains one or more customizations of a report. In one embodiment, the received response element data 144 includes a set of key-value pairs. In one embodiment, the received set of key-value pairs are unordered.

In one embodiment, as additional reports are created, overwritten key-value pairs are received to generate new customized reports by the report module 181 of the data management system 180. In one embodiment, the data management system 180 receives the response element data 144 from the CRC system 120 through application programming interface (API) calls.

In one embodiment, the smart agents 130 identify and validate customizations as discussed above with respect to FIGS. 1A and 1B. In one embodiment, the smart agents 130 collectively form response element data 144 that represents a customization list of customizations formed from user answers to questions. In one embodiment, the response element data 144 is formed in a report-friendly format, such that the report module 181 of the data management system 180 can receive the response element data 144 and build a query from such data to extract data from the transaction data 184.

In one embodiment, the report module 181 of the data management system 180 provides the user system 103 of the user computing environment 102 with an answer to the user's question. For example, if the user is requesting last year quantity sold for a product, the numeric value may be returned to the user. In one embodiment, the report module 181 of the data management system 180 provides the user system 103 with a report based on the user's question.

For example, if the user is again requesting last year quantity sold for a product, a report may be generated that shows monthly quantities for the product sold. In one embodiment, the user is provided with both an answer and a report.

In one embodiment, once the response element data 144 is transmitted by the report interface module 125, process flow proceeds to EXIT OPERATION 215.

In one embodiment, at EXIT OPERATION 215, the process 200 for conversational report customization is exited.

Operational Example

Figure 3:
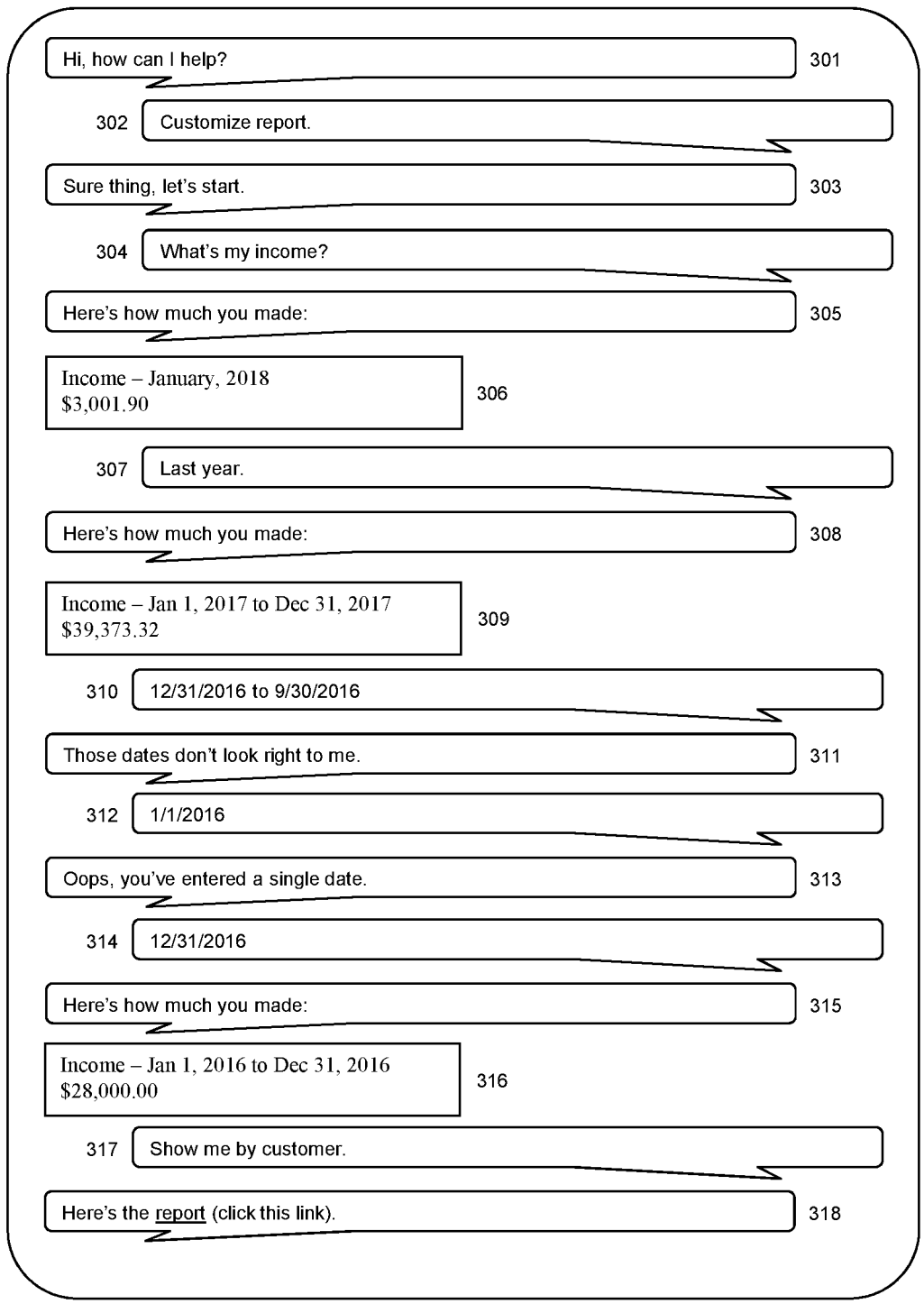
FIG. 3 is a specific illustrative example of a report customization user interface display, in accordance with one embodiment.

FIG. 3 is an illustrative example of a conversational user interface display 300 for conversational report customization, in accordance with one embodiment. Referring to FIGS. 1A, 1B, 1C, and 3 together, the conversational user interface display 300 illustrates a conversation between a CCS and a user.

The conversational interface display 300 includes a CCS statement 301 of, "Hi, how can I help?" In one embodiment, the CCS statement 301 is based on CCS data 163 of the CCS 160. In one embodiment, the CCS 160 initiates a CCS conversation.

The conversational interface display 300 includes a user statement 302 of "Customize report." In one embodiment, the user statement 302 is in response to a prompt based on CCS data 163 representing suggestions for statements that a user can make, such as "How much did I make last month?" and "What did I spend the most on this quarter?"

The conversational interface display 300 includes a CCS statement 303 of "Sure thing, let's start." In this illustrative example of FIG. 3, the CCS and the user have engaged in a dialog of three statements in preparation for report customization.

The conversational interface display 300 includes a user statement 304 of "What's my income?" In one embodiment, the user statement 304 is an utterance of the user. In one embodiment, the utterance is transmitted by the CCS 160 to the CRC system 120 as conversational data 105 via the CCS conversation interface 121. In one embodiment, the CRC system 120 determines the intent of the user's utterance.

In one embodiment, as a specific illustrative example, it is stipulated that a first smart agent such as option A smart agent 130A is a report-identifier smart agent 130A that determines the intent of the conversational data 105. In one embodiment, the report-identifier smart agent 130A determines that the user intends to view a profit and loss statement.

In one embodiment, in this specific illustrative example, it is further stipulated that option B smart agent is a date smart agent 130B that determines that the intended date is this month. In one embodiment, the intended date is determined based on a machine-learning algorithm that determines that the user's preference is to view monthly reports. In one embodiment, response element data 144 is transmitted to the report module 181 of the data management system 180.

The conversational interface display 300 includes a CCS statement 305 of "Here's how much you made:" followed by a customized report 306. In one embodiment, the customized report 306 is created by the report module 181 based on the response element data 144. In one embodiment, the customized report 306 includes a link to a more detailed customized report, such as a report with rows and columns of information, that a user is able to view via the data management system user interface module 185. In one embodiment, the customizations of the customized report 306 can be saved as memorized report data 126.

The conversational interface display 300 includes a user statement 307 of "Last year." In one embodiment, the user statement 307 is a slot. In one embodiment, the slot is transmitted by the CCS 160 to the CRC system 120 as conversational data 105 via the CCS conversation interface 121. In one embodiment, the date smart agent 130B parses the conversational data 105, validates it, maps it, and generates response element data 144. In one embodiment, the date smart agent 130B overwrites the prior response element data 144 that included a date of month. In one embodiment, the response element data 144 is transmitted to the report module 181 of the data management system.

The conversational interface display 300 includes a CCS statement 308 of "Here's how much you made:" followed by a customized report 309. In one embodiment, the customized report 309 is created by the report module 181 based on the response element data 144. In one embodiment, the context of the conversation with the user is maintained due to contextual data being stored by the shared memory module 140. In this illustrative example, the data of the shared memory module 140 indicates that the report-identifier smart agent 130A had earlier identified a profit and loss statement as being desired by the user.

The conversational interface display 300 includes a user statement 310 of "12/31/2016 to 9/30/2016." In one embodiment, the user statement 310 is a slot. In one embodiment, the slot is transmitted by the CCS 160 to the CRC system 120 as conversational data 105 via the CCS conversation interface 121. In one embodiment, the date smart agent 130B parses the conversational data 105 and validates it. In one embodiment, the date smart agent 130B determines that the conversational data 105 contains an invalidity, such as an end date being before a start date.

The conversational interface display 300 includes a CCS statement 311 of "Those dates don't look right to me." In one embodiment, the CCS statement 311 is based on a prompt from the date smart agent 130B. In one embodiment, the prompt is based on the determination of invalidity of the conversational data 105.

The conversational interface display 300 includes a user statement 312 of "1/1/2016." In one embodiment, the user statement 312 is a slot. In one embodiment, the slot is transmitted by the CCS 160 to the CRC system 120 as conversational data 105 via the CCS conversation interface 121. In one embodiment, the date smart agent 130B parses the conversational data 105 and validates it. In one embodiment, the date smart agent 130B determines that the conversational data 105 contains an invalidity, such as an end date is missing. In one embodiment, the date smart agent 130B stores the single date as pending customization data 141. In one embodiment, the pending customization data 141 is stored in the shared memory module 140.

The conversational interface display 300 includes a CCS statement 313 of "Oops, you've entered a single date." In one embodiment, the CCS statement 313 is based on a prompt from the date smart agents 130B. In one embodiment, the prompt is based on the determination of invalidity of the conversational data 105.

The conversational interface display 300 includes a user statement 314 of "12/31/2016." In one embodiment, the user statement 314 is a slot of the user. In one embodiment, the slot is transmitted by the CCS 160 to the CRC system 120 as conversational data 105 via the CCS conversation interface 121. In one embodiment, the date smart agent 130B parses the conversational data 105 and validates it. In one embodiment, the date smart agent 130B determines that the conversational data 105 is added to the pending customization data 141, because it is determined that the date of the user statement 314 is an end date that matches the prior start date of the user statement 312. In one embodiment, the pending customization data 141 is validated, mapped, and generated as response element data 144. In one embodiment, the date smart agent 130B overwrites the prior response element data 144 that included a date of last year. In one embodiment, the response element data 144 is transmitted to the report module 181 of the data management system.

The conversational interface display 300 includes a CCS statement 315 of "Here's how much you made:" followed by a customized report 316. In one embodiment, the customized report 316 is created by the report module 181 based on the response element data 144.

The conversational interface display 300 includes a user statement 317 of "Show me by customer." In one embodiment, the user statement 317 is a slot. In one embodiment, the slot is transmitted by the CCS 160 to the CRC system 120 as conversational data 105 via the CCS conversation interface 121. In one embodiment, in this specific illustrative example, it is stipulated that option C smart agent 130C is a grouping smart agent 130C that parses the conversational data 105, validates it, maps it, and generates response element data 144. In one embodiment, the response element data 144 is transmitted to the report module 181 of the data management system.

The conversational interface display 300 includes a CCS statement 318 of "Here's the report (click this link)." In one embodiment, the customized report referenced in statement 318 is created by the report module 181 based on the response element data 144 that includes the grouping instruction to group the report by customer.

Those of skill in the art will readily recognize that FIG. 3 is but one illustrative example of a conversational user interface display 300. Consequently, the specific example shown in FIG. 3 should not be read to limit the scope of the claims as set forth below.

FIG. 4 is an illustrative example of a customized report 400 for conversational report customization, in accordance with one embodiment. Referring to FIGS. 1A, 1B, 1C, 3, and 4 together, the customized report 400 illustrates the report that was created for the CCS statement 318 of the conversational interface display 300 of FIG. 3. In one embodiment, the customized report 400 includes at least one column 411 and at least one row 412. In one embodiment, the customized report 400 includes a column header 421 for the column 411. In one embodiment, the customized report 400 includes a row header 422 for the row 412. In one embodiment, the customized report 400 includes a title 431.

In one embodiment, the customized report 400 is created by the report module 181 of the data management system 180. In one embodiment, the report module 181 creates the customized report 400 based on received response element data 144. In one embodiment, the response element data 144 represents report customization instructions. In one embodiment, the customized report 400 is created in real-time.

In one embodiment, the customized report 400 is created based on transaction data 184 of the transaction database 183 of the data management system 180. In one embodiment, the transaction data 184 is associated with a user of the data management system. In one embodiment, the transaction data 184 is filtered based on the response element data 144.

In one embodiment, the customized report 400 is provided to a user of the data management system 180 via the data management system user interface module 185 of the data management system 180. For example, the customized report 400 is displayed on a graphical user interface of the user system 103. For further example, the customized report 400, or a portion of the customized report 400, is displayed as a widget of a dashboard on a graphical user interface of the user system 103. In one embodiment, the customized report 400 is provided to a user of the data management system 180 via the CUI 165 of the CCS 160. For example, the customized report 400, or a portion of the customized report 400, is displayed as a statement by a CCS within a conversation between the CCS and the user.

Those of skill in the art will readily recognize that FIG. 4 is but one illustrative example of a customized report 400. Consequently, the specific example shown in FIG. 4 should not be read to limit the scope of the claims as set forth below.

Term Definitions

Various embodiments of systems and methods described herein include one or more computers, which may also be referred to herein as computing systems or processors. As used herein the term computer includes any programmable machine or machines capable of performing arithmetic and/or logical operations. In various embodiments, computers include one or more of processors, memories, data storage devices, and/or other components as discussed herein, and/or as known in the art at the time of filing, and/or as developed after the time of filing. In various embodiments, these components are connected physically or through network or wireless links. In various embodiments, computers include software which directs the operations of the aforementioned components. In various embodiments, the software can thereby transform the aforementioned computers and components into special purpose computers and components.

Herein, computers may also be referred to with terms that are commonly used by those of ordinary skill in the relevant arts, such as servers, PCs, mobile devices, routers, switches, data centers, distributed computers, and other terms. In various embodiments, computers facilitate communications between users and/or other computers, provide databases, perform analysis and/or transformation of data, and/or perform other functions. It will be understood by those of ordinary skill that those terms used herein are interchangeable, and any computer capable of performing the described functions may be used.

In various embodiments, computers may be linked to one another via a network or networks. In various embodiments, a network is any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connections). In various embodiments, connections between computers may use any protocols, including connection-oriented protocols such as TCP or connectionless protocols such as UDP. Any connection through which at least two computers may exchange data can be the basis of a network.

Herein, the term "production environment" includes the various components, or assets, used to deploy, implement, access, and use, a given application as that application is intended to be used. In various embodiments, production environments include multiple computers and/or assets that are combined, communicatively coupled, virtually and/or physically connected, and/or associated with one another, to provide the production environment implementing the application.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. The hardware systems may employ processing logic that includes one or more processors, microprocessors, multi-core processors, and/or Field Programmable Gate Arrays (FPGAs) to execute operations disclosed herein. One or more memory (volatile and/or non-volatile) may be communicatively coupled to the processing logic to store instructions to execute operations and/or store data. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

Herein, a data management system can be, but is not limited to, any system or application implemented on a computing system, accessed through one or more servers, accessed through a network, accessed through a cloud, and/or provided through any system or by any means, as discussed herein, and/or as known in the art at the time of filing, and/or as developed after the time of filing, that gathers data from one or more sources and/or has the capability to analyze and categorize at least part of the data.

Herein, a financial management system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers financial data, including financial transactional data, from one or more sources and/or has the capability to analyze and categorize at least part of the financial data.

As used herein, the term financial management system includes, but is not limited to the following: computing system implemented, and/or online, and/or web-based, personal and/or business financial data management systems, services, packages, programs, modules, or applications; computing system implemented, and/or online, and/or web-based, personal and/or business tax preparation systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

As used herein, the terms "artificial intelligence," "machine learning," and "machine learning algorithms" include, but are not limited to, machine learning algorithms for predictive model training operations such as one or more of artificial intelligence operations, regression, logistic regression, decision trees, artificial neural networks, support vector machines, linear regression, nearest neighbor methods, distance based methods, naive Bayes, linear discriminant analysis, k-nearest neighbor algorithm, another query classifier, and any other presently known or later developed predictive model training operations, according to one embodiment.

As used herein, the terms "user," "client," and "customer" include, but are not limited to, any party, parties, entity, or entities using, or otherwise interacting with any of the methods or systems discussed herein. For instance, in various embodiments, a user can be, but is not limited to, a person, a commercial entity, an application, a service, or a computing system.

As used herein, the terms "chatbot conversational system" and "CCS" include, but are not limited to, a system that conducts conversations utilizing a chatbot, a speech recognition system, and any other chatbot conversational system, as discussed herein, or as known in the art at the time of filing, or as developed, or becomes available, after the time of filing.

As used herein, the terms "conversational report customization system" and "CRC system" include, but are not limited to, a system that includes a plurality of smart agents, and any other conversational report customization system, as discussed herein, or as known in the art at the time of filing, or as developed, or becomes available, after the time of filing.

As used herein, the terms "shared memory" and "shared memory module" include, but are limited to, a memory that is shared by a plurality of smart agents, a memory that includes a blackboard data structure, a blackboard architecture, a shared common data area, and any other shared memory, as discussed herein, or as known in the art at the time of filing, or as developed, or becomes available, after the time of filing.

As used herein, the term "smart agent" includes, but is not limited to, an agent that parses conversational data to pending customization data, validates pending customization to validated customization data, maps validated customization data to mapped customization data, and generates response element data, as discussed herein, or as known in the art at the time of filing, or as developed, or becomes available, after the time of filing.

As used herein, the terms "parsing" and "parse" include, but are not limited to, extracting pertinent information from a user's utterance. In one embodiment, key words or phrases are identified to parse a user's utterance. In one embodiment, pertinent information is related to an option of a base report. In one embodiment, customization data is parsed from a user's utterance. In one embodiment, a smart agent receives a user's utterance in the form of conversational data, such as natural language phrases, and customization data is parsed from the conversational data. For example, a user's utterance may be "display the report for last year." In this example, a base report may have a time period option, and the customization that is parsed from such an utterance may be the time period of "LAST YEAR."

As used herein, the terms "validating" and "validate" include, but are not limited to, analyzing parsed data to be valid with respect to an option of a base report and/or with respect to another customization of a base report. For example, a period of "last year" may be analyzed to be valid in relation to a balance sheet report, as balance sheet reports are allowed to be generated based on last year's data. For further example, a base report may include a first option of a start date of a time period and second option of an end date of a time period. In this example, a first customization of a start date of a time period may be validated in relation to a second customization of an end date of a time period. For example, a start date of Jan. 15, 2016 and an end date of Jan. 10, 2016, would be analyzed to be an invalid time period because the start date customization is after the end date customization.

As used herein, the terms "mapping" and "map" include, but are not limited to, determining which option of a base report is being referenced by parsed data. In one embodiment, an option may be represented by a key. For example, a time period of "LAST YEAR" may be mapped to a base report's time period option. In this example, the option key is "PERIOD" as the phrase "LAST YEAR" maps to the "PERIOD" option that allows for the customization of a report based on a time period.

As used herein, the terms "generating" and "generate" include, but are not limited to, determining response element data based on a mapping of parsed data. In one embodiment, key-value pair data is generated from a mapping of parsed data. For example, a parsing may determine that a value is "LAST YEAR," a mapping may determine that a key is "PERIOD," a generating operation may generate a key value pair of "PERIOD=LAST YEAR."

As used herein, the terms "serializing," "serialize," "deserializing," and "deserialize" include, but are not limited to, translating data from one format to another. In one embodiment, serializing data transforms data from a first format to a second format. In one embodiment, deserializing data transforms the data from the second format to the first format. In one embodiment, serializing and deserializing data changes the syntactics, i.e., the structure, of the data without changing the semantics, i.e., the meaning.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining," "training," "extracting," "executing," "mapping," "analyzing," "providing," "enforcing," "monitoring," "generating," "defining," "determining," "calculating," "transforming," "correlating," "normalizing," "accessing," "identifying," "associating," "aggregating," "initiating," "collecting," "creating," "transferring," "storing," "searching," "comparing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or another device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

The invention claimed is:

1. A method for conversational report customization performed by a Conversational Report Customization (CRC) system communicatively coupled to a Chatbot Conversation System (CCS), the CRC system including a shared memory and a plurality of smart agents, each smart agent assigned to a corresponding report customization option, the method comprising:

receiving, through the CCS, conversational data associated with a user of a data management system and indicating an intent of the user to obtain a report from the data management system;

selecting, from the data management system, a user desired base report configured to fulfill the intent of the user;

determining one or more user desired report customization options based on analyzing the conversational data;

activating one or more smart agents of the plurality of smart agents that are assigned to each of the one or more user desired report customization options, wherein a respective smart agent of the one or more activated smart agents performs operations comprising:

generating response element data associated with the user desired report customization option assigned to the respective smart agent;

providing the respective response element data to the shared memory;

determining the users current preferences based at least in part on the user's prior preferences using a machine-learning analysis associated with the respective smart agent;

parsing the conversational data based on the user's determined current preferences to generate pending customization data and providing the pending customization data to the shared memory;

validating the pending customization data and providing the validated customization data to the shared memory, the validated customization data representing a validation of the report customization;

mapping the validated customization data to generate mapped customization user desired report customization option associated with the respective smart agent to available data management system report customization options and providing the mapped customization data to the shared memory; and generating the response element data from the mapped customization data, the response element data representing a report customization instruction, and providing the response element data to the shared memory;

collecting the response element data from the one or more activated smart agents from the shared memory;

generating a customized report query based on the collected response element data;

providing the customized report query data to the data management system;

generating a customized report for the user based on the customized report query data; and providing the customized report to the user.

2. The method of claim 1, wherein the respective smart agent of the one or more activated smart agents performs operations further comprising:

prompting the CCS for additional conversational data based on the validated customization data.

3. The method of claim 1, wherein the data management system is a financial data management system, wherein the report from the data management system is a financial report, and wherein the user desired base report is a user desired base financial report.

4. The method of claim 1, wherein the respective smart agent of the one or more activated smart agents performs operations further comprising:

parsing the additional conversational data to generate the additional pending customization data and providing the additional pending customization data to the shared memory;

validating the additional pending customization data to generate the additional validated customization data and providing the additional validated customization data to the shared memory;

mapping the additional validated customization data to generate the additional mapped customization data and providing the additional mapped customization data to the shared memory; or generating the additional response element data from the additional mapped customization data and providing the additional response element data to the shared memory.

5. The method of claim 4, further comprising:

collecting the additional response element data from the shared memory;

generating a modified customized report query based on the collected additional response element data;

providing the modified customized report query data to the data management system;

generating a modified customized report for the user based on the modified customized report query data; and providing the modified customized report to the user.

6. The method of claim 1, wherein the customized report query data is a customized financial report query, and wherein the customized report data is a customized financial report for the user.

7. A system for conversational report customization, comprising:

a data management system configured to provide one or more base reports to users of the data management system;

a Chatbot Conversation System (CCS) configured to receive and send conversational data associated with the users of the data management system; and a Conversational Report Customization (CRC) system communicatively coupled to the CCS, the CRC system including:

a shared memory;

a plurality of smart agents;

at least one processor; and at least one memory coupled to the at least one processor, the at least one memory having stored therein instructions which, when executed by the at least one processor, performs operations comprising:

receiving, through the CCS, conversational data associated with a user of the data management system and indicating an intent of the user to obtain a report from the data management system;

selecting, from the data management system, a user desired base report configured to fulfill the intent of the user;

determining one or more user desired report customization options based on analyzing the conversational data;

activating one or more smart agents of the plurality of smart agents that are assigned to each of the one or more user desired report customization options, wherein a respective smart agent of the one or more activated smart agents performs operations comprising:

generating response element data associated with the user desired report customization option assigned to the respective smart agent;

providing the respective response element data to the shared memory;

determining the user's current preferences based at least in part on the users prior preferences using a machine-learning analysis associated with the respective smart agent;

parsing the conversational data based on the users determined current preferences to generate pending customization data and providing the pending customization data to the shared memory;

validating the pending customization data and providing the validated customization data to the shared memory, the validated customization data representing a validation of the report customization;

mapping the validated customization data to generate mapped customization user desired report customization option associated with the respective smart agent to available data management system report customization options and providing the mapped customization data to the shared memory; and generating the response element data from the mapped customization data, the response element data representing a report customization instruction, and providing the response element data to the shared memory;

collecting the response element data from the one or more activated smart agents from the shared memory;

generating a customized report query based on the collected response element data;

providing the customized report query data to the data management system;

generating a customized report for the user based on the customized report query data; and providing the customized report to the user.

8. The system of claim 7, wherein the respective smart agent of the one or more activated smart agents performs operations further comprising:

prompting the CCS for additional conversational data based on the validated customization data.

9. The system of claim 7, wherein the data management system is a financial data management system, wherein the report from the data management system k a financial report, and wherein the user desired base report is a user desired base financial report.

10. The system of claim 7, wherein the customized report query data is a customized financial report query, and wherein the customized report data is a customized financial report for the user.

* * * * *